US008788697B2

(12) United States Patent
Fujiwara et al.

(10) Patent No.: US 8,788,697 B2
(45) Date of Patent: Jul. 22, 2014

(54) FILE TRANSMITTING APPARATUS, FILE TRANSMITTING METHOD, FILE RECEIVING APPARATUS, FILE RECEIVING METHOD, AND FILE TRANSFER SYSTEM

(75) Inventors: Kazunari Fujiwara, Osaka (JP); Takumi Tanabe, Hyogo (JP); Yasushi Ayaki, Osaka (JP)

(73) Assignee: Panasonic Corporation, Osaka (JP)

( * ) Notice: Subject to any disclaimer, the term of this patent is extended or adjusted under 35 U.S.C. 154(b) by 1423 days.

(21) Appl. No.: 11/705,023

(22) Filed: Feb. 12, 2007

(65) Prior Publication Data
US 2007/0192470 A1  Aug. 16, 2007

(30) Foreign Application Priority Data
Feb. 13, 2006 (JP) ................... 2006-035805

(51) Int. Cl.
*G06F 15/16* (2006.01)
(52) U.S. Cl.
USPC ............................ 709/232; 709/217; 709/230
(58) Field of Classification Search
USPC ........................................ 709/230, 217, 232
See application file for complete search history.

(56) References Cited

U.S. PATENT DOCUMENTS

| 5,337,360 | A  | * | 8/1994  | Fischer .......................... 713/176 |
| 5,920,895 | A  | * | 7/1999  | Perazzoli et al. .............. 711/163 |
| 5,987,506 | A  | * | 11/1999 | Carter et al. .................. 709/213 |
| 6,230,190 | B1 | * | 5/2001  | Edmonds et al. ............. 709/213 |
| 6,795,788 | B2 | * | 9/2004  | Thatcher et al. .............. 702/119 |
| 6,976,077 | B1 | * | 12/2005 | Lehew et al. .................. 709/229 |
| 7,233,946 | B1 | * | 6/2007  | McPolin ........................... 707/8 |
| 2002/0099798 | A1 | * | 7/2002  | Fedorovsky et al. ......... 709/219 |
| 2003/0005288 | A1 | * | 1/2003  | Moskowitz et al. .......... 713/156 |
| 2004/0049655 | A1 | * | 3/2004  | Allison .......................... 712/200 |
| 2004/0059649 | A1 | * | 3/2004  | Sakuma et al. ................. 705/28 |
| 2005/0289512 | A1 | * | 12/2005 | Matsusaka ..................... 717/120 |
| 2006/0184505 | A1 | * | 8/2006  | Kedem et al. ..................... 707/1 |

FOREIGN PATENT DOCUMENTS

| JP | 2004-7356 | 1/2004 |
| WO | 2006/046446 | 5/2006 |

OTHER PUBLICATIONS

"*Digital Transmission Content Protection Specification* vol. 1 (*Information Version*)", Hitachi, Ltd., Intel Corporation, Matsushita Electric Industrial Co., Ltd., Sony Corporation, Toshiba Corporation, Revision 1.4, Feb. 28, 2005, pp. 1-81.

\* cited by examiner

*Primary Examiner* — Aaron Strange
(74) *Attorney, Agent, or Firm* — Wenderoth, Lind & Ponack, L.L.P.

(57) ABSTRACT

A source device includes: a storage unit which stores the file; a receiving unit which receives, from a sink device, a file acquisition request; a transmitting unit which transmits, to the sink device, data within a range specified in the file acquisition request received by the receiving unit, from among the file stored in the storage unit; a limitation unit which deletes or makes unusable data within the range transmitted by the transmitting unit, from among the file stored in the storage unit; and a notification unit which notifies the sink device of a usable range which is a range in which the file is neither deleted nor made unusable by the limitation unit, from among the file stored in the storage unit.

10 Claims, 21 Drawing Sheets

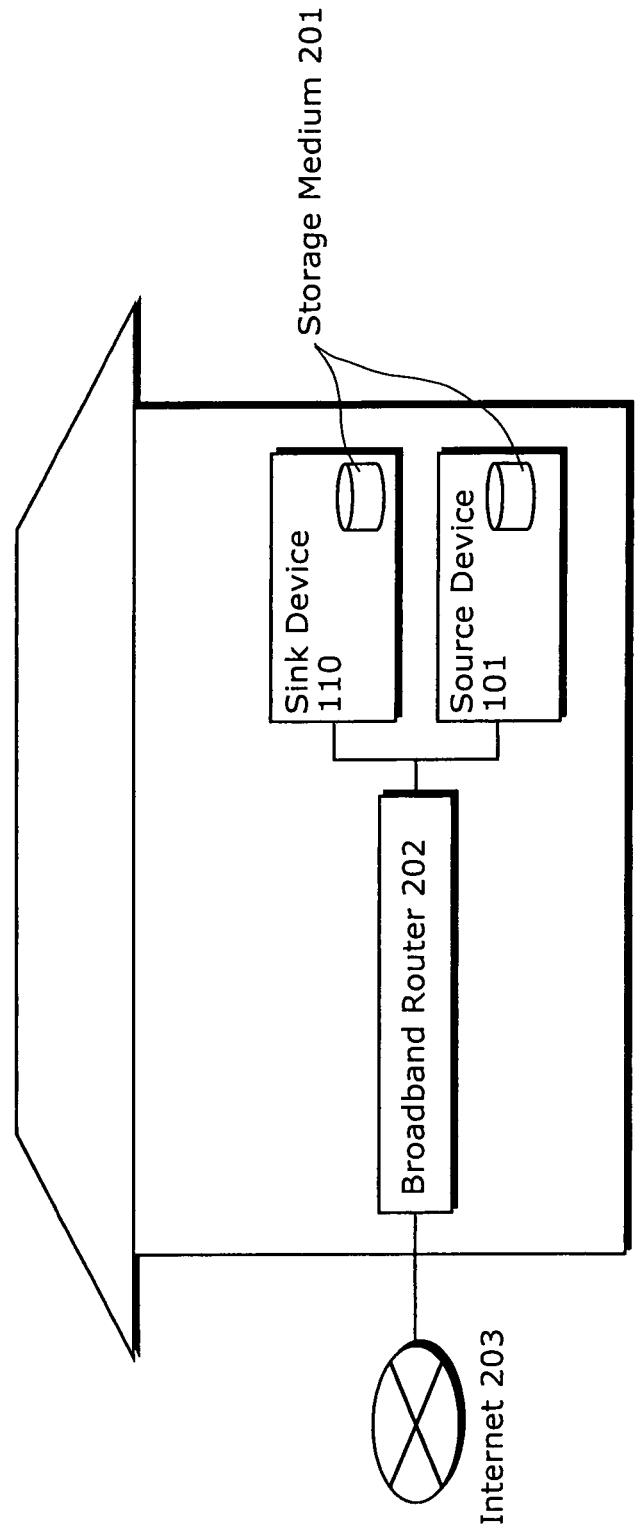

Fig. 4A

| File | Whole Size | Usable Range |
|---|---|---|
| File A | 900byte | 0-900byte |
| File B | 2000byte | 0-2000byte |

Fig. 4B

| File | Whole Size | Usable Range |
|---|---|---|
| File A | 1000byte | 100-1000byte |
| File B | 2000byte | 0-2000byte |

Fig. 5A

| File | Whole Size | Usable Range |
|---|---|---|
| File A | 900byte | 0-900byte |
| File B | 2000byte | 0-2000byte |

Fig. 5B

| File | Whole Size | Usable Range |
|---|---|---|
| File A | 1000byte | 0-100,200-1000byte |
| File B | 2000byte | 0-2000byte |

Fig. 6A

| File | Whole Size | Usable Range | Size Before Transfer |
|---|---|---|---|
| File A | 900byte | 0-900byte | 1000byte |
| File B | 2000byte | 0-2000byte | 2000byte |

Fig. 6B

| File | Whole Size | Usable Range | Size Before Transfer |
|---|---|---|---|
| File A | 1000byte | 100-1000byte | 1000byte |
| File B | 2000byte | 0-2000byte | 0-2000byte |

Fig. 7A

| File | Whole Size | Usable Range |
|---|---|---|
| File A | 900byte | 0-900byte |

Fig. 7B

| File | Whole Size | Usable Range |
|---|---|---|
| File A | 1000byte | 100-1000byte |

Fig. 8A

| File | Range |
|---|---|
| File A | 0-100byte |

Fig. 8B

| File | Range |
|---|---|
| File A | 100-200byte |

Fig. 15

| File | Transfer Site Information |
|---|---|
| File A | AAA.BBB.CCC.DDD |

Fig. 16A

| File | Whole Size | Usable Range | Transfer Range |
|---|---|---|---|
| File A | 900byte | 0-900byte | 0-100byte |
| File B | 2000byte | 0-2000byte | 0byte |

Fig. 16B

| File | Whole Size | Usable Range | Transfer Range |
|---|---|---|---|
| File A | 1000byte | 100-1000byte | 0-100byte |
| File B | 2000byte | 0-2000byte | 0byte |

Fig. 17A

| File | Whole Size | Usable Range | Transfer Site Information | Transfer Range |
|---|---|---|---|---|
| File A | 900byte | 0-900byte | AAA.BBB.CCC.DDD | 0-100byte |

Fig. 17B

| File | Whole Size | Usable Range | Transfer Site Information | Transfer Range |
|---|---|---|---|---|
| File A | 1000byte | 100-1000byte | AAA.BBB.CCC.DDD | 0-100byte |

Fig. 23A
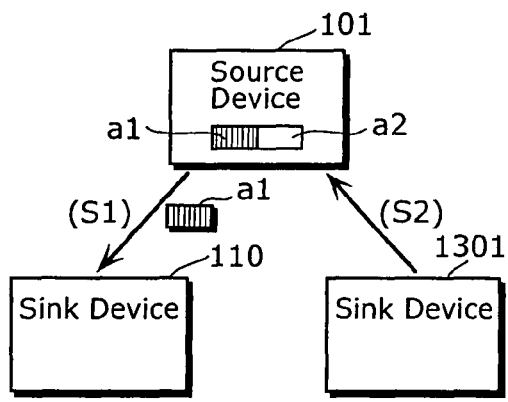
Fig. 23B
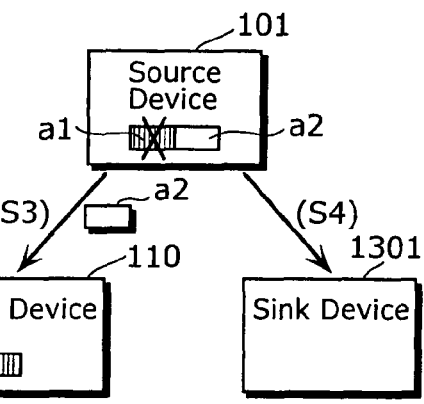
Fig. 23C
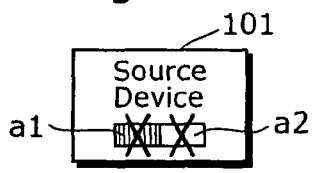
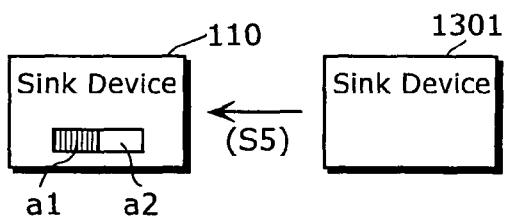
Fig. 23D
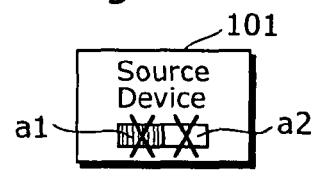
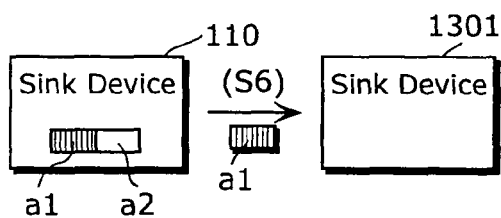
Fig. 23E
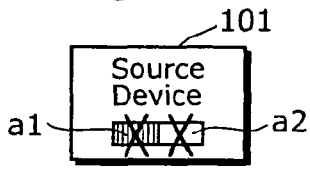
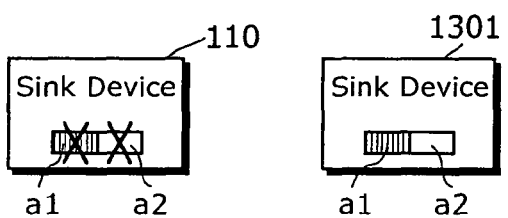

FILE TRANSMITTING APPARATUS, FILE TRANSMITTING METHOD, FILE RECEIVING APPARATUS, FILE RECEIVING METHOD, AND FILE TRANSFER SYSTEM

BACKGROUND OF THE INVENTION (1) Field of the Invention

The present invention relates to a file transfer system which transfers a file between a home electric appliance and a personal computer (PC), and in particular relates to a file transfer system which divides a Copy One Generation file that can be copied and transfers the file.

(2) Description of the Related Art

Recently, Internet connections have become widespread in both business and ordinary households due to the development of broadband environments such as xDSL and fiber optics. Moreover, a home network environment in which a consumer PC and home electric appliances are connected via Ethernet™, wireless LAN, and so forth are becoming common. Thus, not only PCs, but also home electric appliances like televisions, DVD recorders, air conditioners, and refrigerators can now be connected to one another.

As one application in the Internet or home network, there is an application for transferring a file between home electric appliances and PCs or the like. For instance, there are examples in which editing is performed by transferring a TV program recorded on the DVD recorder to the PC, a recorded MPEG 2 file is transferred and dubbed between DVD recorders, and so on.

Conventionally, Digital Transmission Content Protection (DTCP) exists as a technique to prevent illegal copying using such a file transfer. In DTCP, "Copy Never," for prohibiting a copy completely, "Copy One Generation," for permitting copying of a first generation only, and "Copy Free," for copying freely, are defined as use permission information (refer to "Digital Transmission Content Protection Specification Volume 1 (Informational Version)", Hitachi, Ltd, Intel Corporation, Matsushita Electric Industrial Co., Ltd., Sony Corporation, Toshiba Corporation, Revision 1.4, Feb. 28, 2005). In particular, regarding Copy One Generation, transferring a file to another device (the "sink device") after copying of the first-generation is permitted on the condition that the device in which the file transfer originates (the "source device") deletes the file or makes it unusable immediately after the transfer. Therefore, since the source device strictly observes this condition for Copy One Generation files, file transfer between the devices can be achieved. After copying of the first generation, the Copy One Generation file is changed to a Copy No More file.

SUMMARY OF THE INVENTION

When the size of the file stored in the source device is large, in consideration of network use efficiency, a method by which the file is divided into a number of parts and transmitted is used. For example, the sink device specifies the range of a file in the Range header of the Hyper Text Transfer Protocol (HTTP) GET request, and the source device which receives this GET request transfers the data of the specified range to the sink device. Accordingly, it becomes possible to divide the file stored in the source device into plural parts and transmit the file to the sink device. However, in the case where a Copy One Generation file is transferred according to such a format, a difference will occur between the size of the file by which the source device is stored in the source device depending on whether the transferred file is deleted or is made unusable.

FIG. 1A and FIG. 1B are figures showing a schematic of a method in which a transferred file is deleted and a method in which the transferred file is made unusable. With the format which divides a file into plural pieces and transmits the file, the entire file is not deleted or made unusable at once; rather, a part of the file (an already-transferred portion) is be deleted or made unusable. However, for ease of explanation, it is expressed here that a "transferred file" is deleted or made unusable.

The case where a source device 101 transfers a file 102, which is 1000 bytes altogether, to a sink device 110 in 100-byte units shall be considered, as is shown in this figure. In the method that deletes the transferred file, shown in FIG. 1A, when 100 bytes' worth of data of the file 102 has been transferred, 900 bytes' worth of data remains in the source device 101. On the other hand, 1000 bytes' worth of data remains in the source device 101 in the system which makes the transferred file unusable, as shown in FIG. 1B.

Thus, in the system which deletes the transferred file and the system which makes the transferred file unusable, because a difference occurs in the size of the post-transfer file, the system of requesting the file transfer from the sink device 110 is different thereafter. That is, in the system which deletes the transferred file, the sink device 110 must always request the file transfer based on the head 107 of the file, as shown in FIG. 1A. On the other hand, in the system which makes the transferred file unusable, the sink device 110 must request not the head 123 of the file but must instead request the file transfer based on the continuation 121 of the file acquired previously, as shown in FIG. 1B.

However, under such conditions, the sink device side cannot specify whether the source device has adopted the system which deletes the transferred file or the system which makes the file unusable. Therefore, there is a problem that the sink device cannot request the file transfer from the second time on due to the format in which the file is divided into plural parts and transferred.

The present invention has been conceived in view of the aforementioned problems, and an object thereof is to provide a file transfer system by which the sink device can request the file transfer from the second time on even when either the method which deletes the file that the source device transferred or the method that makes the file unusable, in the method in which the file is divided into plural parts and transferred.

In order to achieve aforementioned object, A file transmitting apparatus according to the present invention transmits a file to another apparatus, and includes: a storage unit which stores the file; a receiving unit which receives, from the other apparatus, a file acquisition request; a transmitting unit which transmits, to the other apparatus, data within a range specified in the file acquisition request received by the receiving unit, from among the file stored in the storage unit; a limitation unit which deletes or makes unusable data within the range transmitted by the transmitting unit, from among the file stored in the storage unit; and a notification unit which notifies the other apparatus of a usable range which is a range in which the file is neither deleted nor made unusable by the limitation unit, from among the file stored in the storage unit. Accordingly, since the usable range, which is a range in which the file is not deleted and not made unusable, is notified to the other apparatus by the limitation unit, from among the file, it is possible for the other apparatus to request the file transfer from the second time on without specifying a wrong range.

Here, the notification unit may notify, to the other apparatus, the size of the entire file after the file has been deleted or made unusable by the limitation unit. Accordingly, it is possible to execute processing that uses information of whole size of file after limiting on the other apparatus sides.

Further, the notification unit may notify, to the other apparatus, the size of the entire file after the file has been deleted or made unusable by the limitation unit. Accordingly, it is possible to execute processing that uses information of whole size of file before limiting on the other apparatus sides.

Further, the file transmitting apparatus may further include an acceptance unit which accepts, from the other apparatus, a query regarding the usable range, and the notification unit is operable to notify the usable range to the other apparatus in the case where the query has been accepted by the acceptance unit. Accordingly, even when information held temporarily on the other apparatus side is deleted due to the other apparatus going down, the other apparatus can acquire the deleted information again by executing the query to the file transmitting apparatus.

Further, the receiving unit may receive the file acquisition request from a different apparatus that is not the other apparatus; and the notification unit may notify the different apparatus of information that can specify the other apparatus. Accordingly, it is possible for a different apparatus to request the file transfer from the other apparatus.

Further, the notification unit may notify the different apparatus of the usable range. Accordingly, it is possible for the different apparatus to request the file transfer from the file transmitting apparatus without specifying a wrong range.

Further, the notification unit may notify the different apparatus of the range that has been transmitted to the other apparatus, from among the file stored in the storage unit. Accordingly, it is possible for the different apparatus to request the file transfer from the other apparatus without specifying a wrong range.

Moreover, in order to achieve the aforementioned object, a file receiving apparatus according to the present invention receives a file from another apparatus, and includes: an acceptance unit which accepts, from the other apparatus, a notification of a usable range which is a range in which the file is neither deleted nor made unusable by the other apparatus, from among the file; a transmitting unit which specifies an arbitrary range included in the usable range and transmits a file acquisition request to the other apparatus; a receiving unit which receives, from the other apparatus, data within the range specified in the file acquisition request; and a storage unit which stores the data received by the receiving unit. Accordingly, since the file receiving apparatus can specify an arbitrary range included in the usable range from among the file, it is possible to request the file transfer from the second time on without specifying a wrong range.

Here, the acceptance unit may accept, from the other apparatus, the size of the entire file after the file has been deleted or made unusable by the other apparatus. Accordingly, it is possible to execute processing that uses information of the whole size of the file after limiting on the file receiving apparatus side.

Further, the acceptance unit may accept, from the other apparatus, the size of the entire file before the file is deleted or made unusable by the other apparatus. Accordingly, it is possible to execute processing that uses information of the whole size of the file before limiting on the file receiving apparatus side.

Further, the file receiving apparatus may further include a query unit which makes an inquiry to the other apparatus regarding the usable range, and the acceptance unit may accept the notification of the usable range from the other apparatus when inquired by the query unit. Accordingly, even when information held temporarily on the file receiving apparatus side is deleted due to the file receiving apparatus going down, the file receiving apparatus can acquire the deleted information again by executing the query to the other apparatus.

Further, the acceptance unit may accept, from the other apparatus, information that can specify a different apparatus that is not the other apparatus, and the transmitting unit may transmit the file acquisition request to the different apparatus. Accordingly, it is possible for the file receiving apparatus to request the file transfer to the different apparatus even while the other apparatus is transferring the file to the different apparatus when the file receiving apparatus transmits the acquisition request for the file to the other apparatus.

Further, the acceptance unit may accept the usable range from the other apparatus, and the transmitting unit may specify an arbitrary range included in the usable range and transmit the file acquisition request to the other apparatus. Accordingly, it is possible that the file receiving apparatus requests the file transfer to the other apparatus without specifying a wrong range, even while the other apparatus is transferring the file to another apparatus when the file receiving apparatus transmits the acquisition request for the file to the other apparatus.

Further, the acceptance unit may accept, from the other apparatus, a range that has been transmitted to the different apparatus, from among the file, and the transmitting unit may specify an arbitrary range included in the usable range and transmit the file acquisition request to the different apparatus. Accordingly, it is possible for the file receiving apparatus to request the file transfer to the different apparatus without specifying a wrong range even while the other apparatus even is transferring the file to the different apparatus when the file receiving apparatus transmits the acquisition request for the file to other apparatus.

In addition, the present invention can be implemented not only as such a file transmitting apparatus or file receiving apparatus, but also as a file transfer system that transfers a file from such a file transmitting apparatus to the file receiving apparatus. Moreover, it is possible to implement the present invention as a method for transmitting a file or a method for receiving the file by implementing the characteristic units included in such a file transmitting apparatus or file receiving apparatus as steps, or to implement the present invention as a program that causes a computer to execute those steps. It goes without saying that such a program can be distributed via a storage medium such as CD-ROM, a transmission medium such as the Internet, or the like.

As has been made clear by the above descriptions, according to the file transfer system of the present invention, in the system which divides the file into plural parts and transmits the file, the usable range, which is a range in which the file is not deleted and is not made unusable, is notified to the file receiving apparatus even when using either the method which deletes the file that the file transmitting apparatus transferred or the method that makes the file unusable. Accordingly, it is possible for the file receiving apparatus to request the file transfer from the second time on without specifying a wrong range.

FURTHER INFORMATION ABOUT TECHNICAL BACKGROUND TO THIS APPLICATION

The disclosure of Japanese Patent Application No. 2006-035805 filed on Feb. 13, 2006, including specification, drawings and claims, is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2 is a figure showing a use environment of a file transfer system in the first embodiment;

FIG. 4A and FIG. 4B are figures showing an example of file control information managed by a file control unit of the source device;

FIG. 5A and FIG. 5B are figures showing another example of file control information managed by the file control unit of the source device;

FIG. 6A and FIG. 6B are figures showing another example file control information managed by the file control unit of the source device;

FIG. 7A and FIG. 7B are figures showing file detail information created by a notification unit of the source device;

FIG. 8A and FIG. 8B are figures showing a file acquisition request created by a transmitting unit of the sink device;

FIG. 15 is a figure showing transfer site information managed by a transfer site management unit of the source device;

FIG. 16A and FIG. 16B are figures showing file control information managed by the file control unit of the source device;

FIG. 17A and FIG. 17B are figures showing file detail information created by the notification unit of the source device;

FIG. 23A to FIG. 23E are figures showing a first mode in which the sink device acquires the entire file;

DESCRIPTION OF THE PREFERRED EMBODIMENT(S)

Figure 1A:
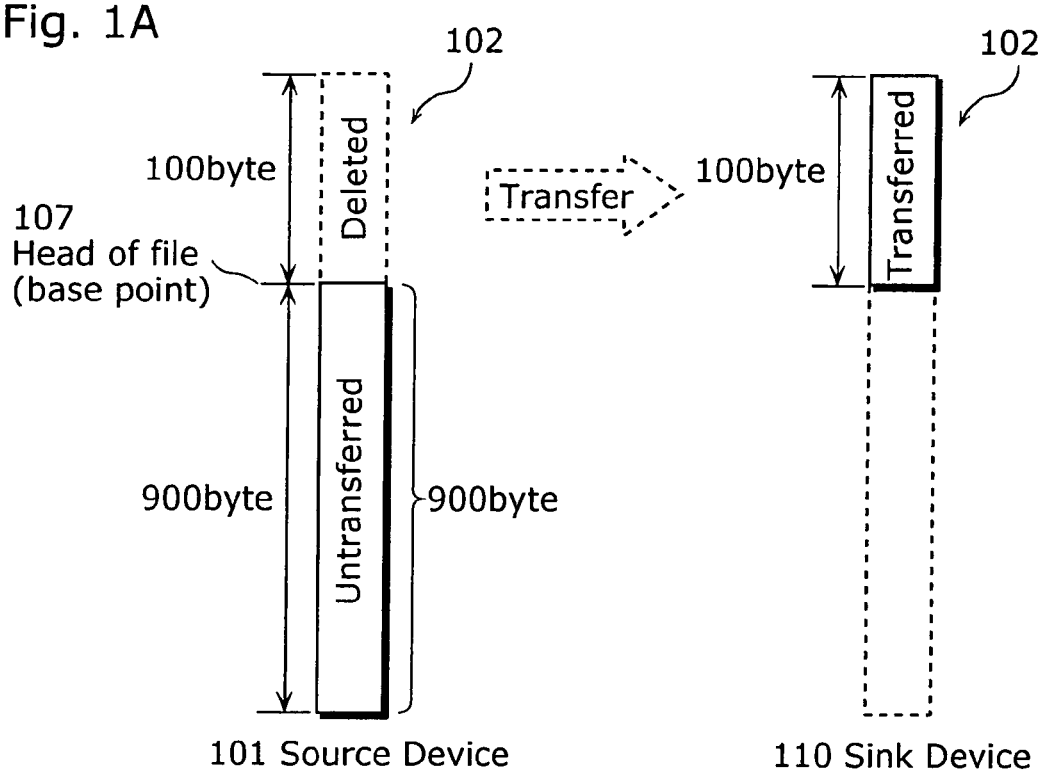
FIG. 1A and FIG. 1B are figures showing a schematic of a system which deletes a transferred file and a system which makes the transferred file unusable.
Figure 1B:
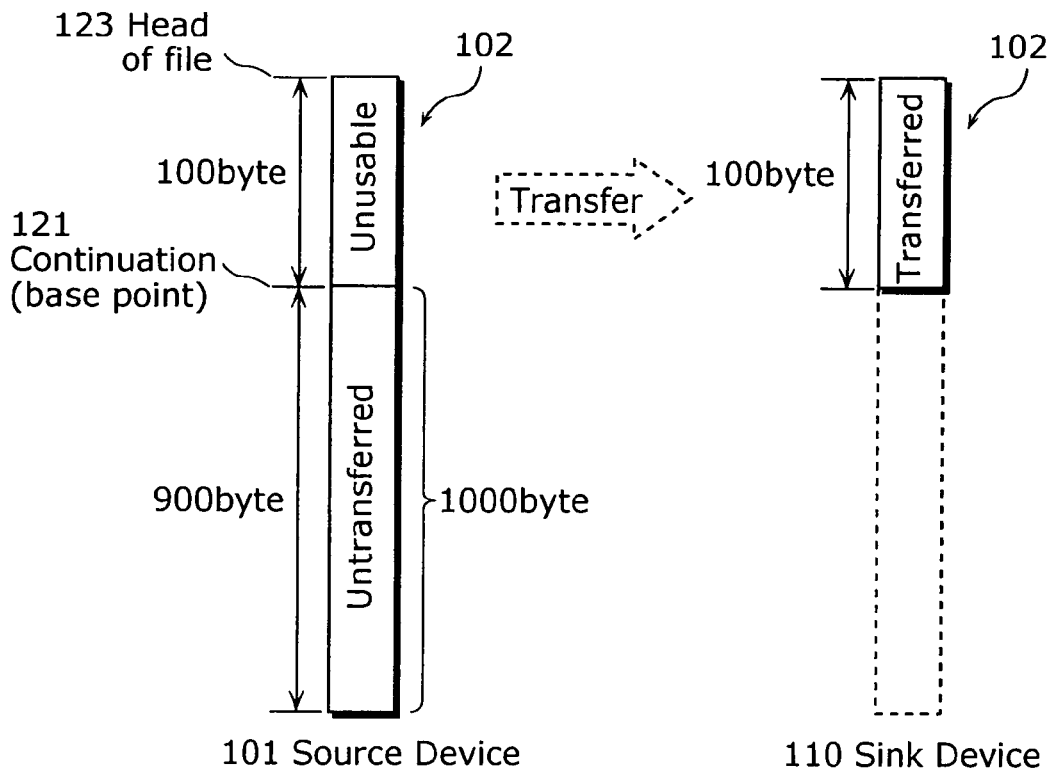

Hereafter, the embodiments of the present invention will be explained in detail referring to the drawings.

First Embodiment

FIG. 2 is a figure showing a use environment of a file transfer system in the first embodiment. The file transfer system includes a source device 101 and a sink device 110 as shown in this figure. The source device 101 and the sink device 110 are connected with a broadband router 202 and make up a home network. The broadband router 202 may be connected to the Internet 203. The source device 101 is a set-top box or the like which transmits the file stored in a storage medium 201 to the sink device 110. The sink device 110 is a DVD/HDD hybrid recorder or the like that receives the file from the source device 101 and stores in a storage medium 201.

In the initial state of the first embodiment, it is assumed that the source device 101 stores a Copy One Generation file and transfers the file to the sink device 110. However, the method for generating the file stored in the source device 101 is not particularly limited. For example, the file can be received from the outside through the network, or can be created within the source device 101. Various types of files, such as video, still pictures, and music can be considered. Various types of networks, such as the Internet and home networks, can be considered for the network. Wired connections, wireless connections, or the like can be considered for the way in which the source device 101 and the sink device 110 connect to the network.

Next, file transfer (MOVE) will be explained.

In DTCP, an Encryption Mode Indicator (EMI) is used as use permission information on a file. EMI has values of "Copy Never" which forbids copying of a file, "Copy One Generation" which only permits copying of one generation, and "Copy Free" which permits copying freely. After copying of the first generation, the Copy One Generation file is changed to a Copy No More file.

Regarding the Copy One Generation file, a second-generation copy performed to other devices (dubbing) is not permitted to be executed after copying of the first generation. However, transferring the file while deleting the file from the source device (MOVE) is permitted when the file is transferred to other devices. That is, when the Copy One Generation file is transferred, the source device must delete the file immediately or to make the file unusable. Deleting the file refers to eliminating the file from the storage medium of the source device completely. Making the file unusable refers to changing the file to a state in which it cannot be accessed through certain methods although the file still exists in the storage medium of source device. As the method for deleting the file and the method for making the file unusable depart from the focus of the present invention, further detailed descriptions thereof shall be omitted.

Figure 3:
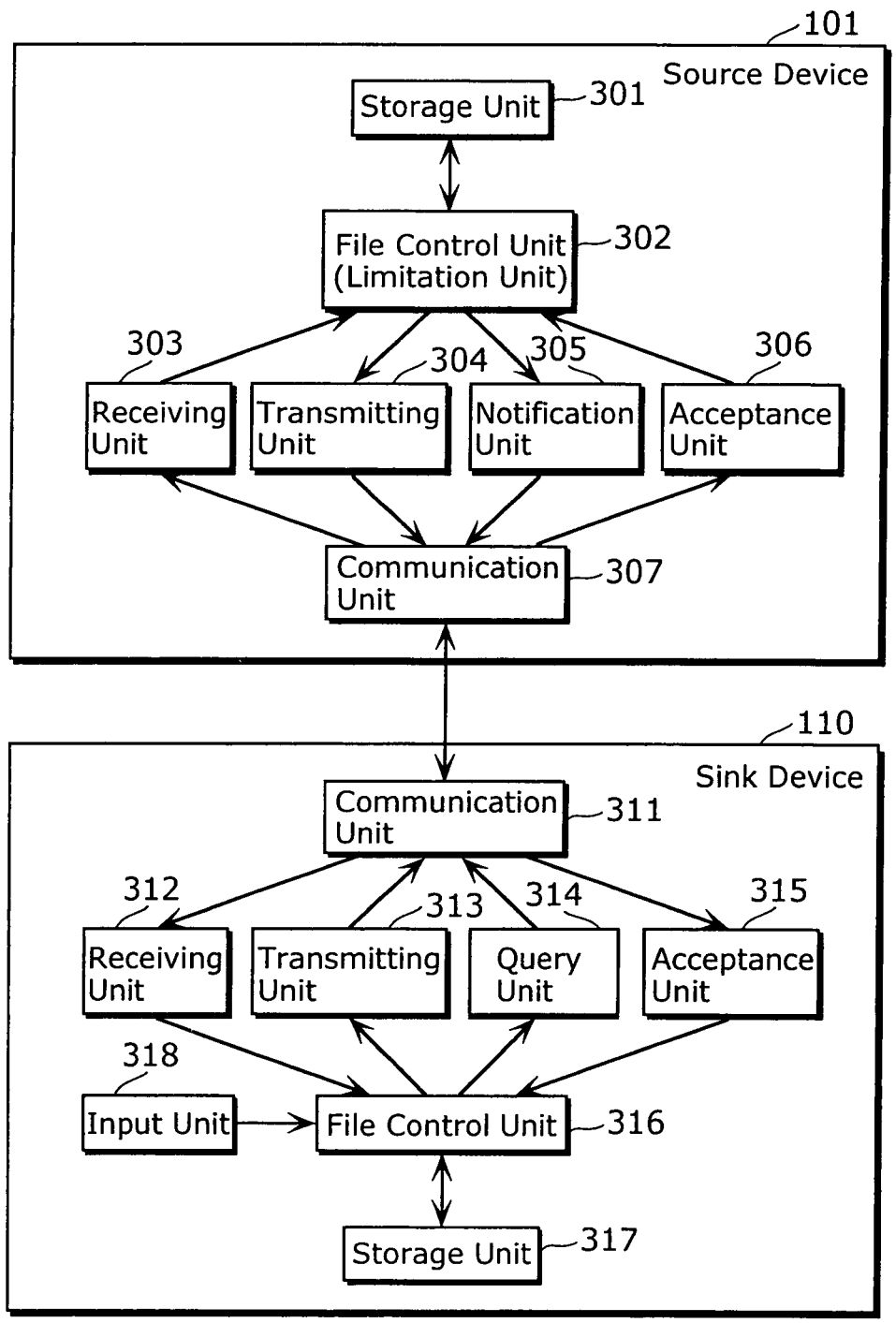
FIG. 3 is a figure showing an internal configuration of a source device and a sink device in the first embodiment.

FIG. 3 is a figure showing an internal configuration of the source device and the sink device in the first embodiment.

The source device 101 functionally includes a storage unit 301, a file control unit 302, a receiving unit 303, a transmitting unit 304, a notification unit 305, an acceptance unit 306, and a communication unit 307, as shown in FIG. 3. The storage unit 301 is a hard disk or the like in which the file is stored. The communication unit 307 is a communication interface which communicates with the sink device 110, and is connected with each of the receiving unit 303, the transmitting unit 304, the notification unit 305, and the acceptance unit 306. The receiving unit 303 receives a file acquisition request from the sink device 110 and notifies the file control unit 302 of the request. The transmitting unit 304 transmits, to the sink device 110, data within the range specified in the file acquisition request received by the receiving unit 303, from among files stored in the storage unit 301. The file control unit 302 is one example of a limitation unit according to the present invention. The file control unit 302 manages the files stored in the storage unit 301 so that data within the range transmitted by the transmitting unit 304 is deleted or made unusable, from among the files stored in the storage unit 301. The notification unit 305 notifies a usable range, which is a range in which the file is not deleted and not made unusable by the file control unit 302, to the sink device 110, from among the files stored in the storage unit 301. The acceptance unit 306 accepts a query regarding the usable range from the sink device 110, and notifies the usable range to the file control unit 302. In addition, the file information managed by the file control unit 302 (hereafter, "file control information") is notified to the transmitting unit 304 and the notification unit 305 if necessary.

On the other hand, the sink device 110 functionally includes a communication unit 311, a receiving unit 312, a transmitting unit 313, a query unit 314, an acceptance unit 315, a file control unit 316, a storage unit 317, and an input unit 318. The communication unit 311 is a communication interface which communicates with the source device 101 through the network. The acceptance unit 315 accepts the notification of the usable range of the file from the source device 101, and notifies the file control unit 316 of the usable range. The transmitting unit 313 transmits a file acquisition request to the source device 101 specifying an arbitrary range included in the usable range. The receiving unit 312 receives data within the range specified in the file acquisition request from the source device 101 and passes the data to the file control unit 316. The storage unit 317 is a hard disk or the like in which the data received by the receiving unit 312 is stored. The query unit 314 inquires regarding the usable range to the source device 101. The file control unit 316 manages the files stored in the storage unit 317. The input unit 318 is buttons or the like for inputting an instruction from a user and notifying it to the file control unit 316. In addition, file information managed by the file control unit 316 is notified to the transmitting unit 313 and the query unit 314 if necessary.

FIG. 4A and FIG. 4B are figures showing an example of the file control information managed by the file control unit 302 of the source device 101. FIG. 4A shows the file control information managed by the file control unit 302 of the source device 101 that deletes the transferred file, and FIG. 4B shows the file control information managed by the file control unit 302 of the source device 101 that makes the transferred file unusable. The source device 101 stores a 1000-byte file A and a 200-byte file B. Here, the state shown is a state in which 100 bytes' worth of data from the head of the file A has been transmitted to the sink device 110.

The file control unit 302 manages the "whole size" and "usable range" for the file stored in the storage unit 301, as shown in this figure.

"Whole size" refers to the size of each file stored in the storage unit 301. In the previous state in which the file is transferred to the sink device 110, the value of 1000 bytes is inputted for the file A, and the value of 2000 bytes is inputted for the file B. When the source device 101 deletes the transferred file, the "whole size" of the file A becomes 900 bytes through a decrease in 100 bytes occurring when 100 bytes' worth of the data transfer is completed from the head of the file A, as shown in FIG. 4A. On the other hand, when the source device 101 makes the transferred file unusable, the "whole size" of the file A does not change from 1000 bytes after 100 bytes' worth of the data transfer is completed from the head of the file A, as shown in FIG. 4B.

"Usable range" refers to a usable range of the file stored in the storage unit 301. When the source device 101 deletes a transferred file, a reference point which indicates the head of the range of the file which can be used moves to the head of the file after deletion, and therefore the "usable range" always becomes "0-whole size". Here, "usable range" becomes "0-900 bytes" as shown in FIG. 4A because 100 bytes' worth of data from the head of the file A has been transferred. On the other hand, in the case where the source device 101 makes the transferred file unusable, while the head of the file does not change, the base point that indicates the head within the usable range of the file moves from the head of the file to the location of 100 bytes. That is, since the "usable range" includes the range aside from the range changed to be unusable, the "usable range" becomes "transferred size-whole file size". Here, since 100 bytes' worth of a data transfer is completed from the head of the file A, the "usable range" becomes "100-1000 bytes", as shown in FIG. 4B.

FIG. 5A and FIG. 5B are figures showing another example of file control information managed by the file control unit 302 of the source device 101. FIG. 5A shows the file control information managed by the file control unit 302 of the source device 101 that deletes the transferred file, and FIG. 5B shows the file control information managed by the file control unit 302 of the source device 101 that makes the transferred file unusable. Here, the case described is one where the sink device 110 requests the data transfer within the range from 100 to 200 bytes of the file A. As can be seen in FIG. 5A, since the file control information when the source device 101 deletes the transferred file is similar to that shown in FIG. 4A, detailed descriptions thereof shall be omitted. On the other hand, when data within the range of 100 to 200 bytes of the file A is transferred when the source device 101 makes the transferred file unusable, the data within the range from 100 to 200 bytes of the file A becomes unusable. Therefore, the "usable range" of the file A differs from FIG. 4B, and becomes "0-100, 200-1000 bytes" as shown in FIG. 5B. Explanations regarding the "whole size" shall be omitted as it is similar to FIG. 4B.

FIG. 6A and FIG. 6B are figures showing another example of file control information managed by file control unit 302 of the source device 101. FIG. 6A shows the file control information managed by the file control unit 302 of the source device 101 that deletes the transferred file, and FIG. 6B shows the file control information managed by the file control unit 302 of the source device 101 that makes the transferred file unusable. Here, the file control unit 302 of the source device 101 manages a "size before transfer" in addition to the "whole size" and "usable range". The "size before transfer" is the entire file size before transfer, or in other words, of the entire file size before being deleted or made unusable by the file control unit 302 of the source device 101. As shown in FIG. 6A, when the source device 101 deletes the transferred file, the "size before transfer" is 1000 bytes, while the "whole size" becomes 900 bytes when 100 bytes' worth of the data has been transferred, from the head of the file A. By managing the size before transfer in this manner, even when the source device 101 deletes the transferred file, it is possible to notify the whole size of the original file to the sink device 110, and it is possible to execute the processing using the size before transfer on the sink device 110 side.

FIG. 7A and FIG. 7B are figures showing information created by the notification unit 305 of the source device 101 (hereafter, called, "file detail information"). FIG. 7A shows the file detail information created by the notification unit 305 of source device 101 that deletes the transferred file, and FIG. 7B shows the file detail information created by the notification unit 305 of the source device 101 that makes the transferred file unusable. The notification unit 305 creates the file detail information on the basis of the file control information managed by the file control unit 302, and notifies the created file detail information to the sink device 110.

The "whole size" and "usable range" included in the file detail information are the same as those included in the file control information. That is, the "whole size" is a size of each file stored in the storage unit 301, and "usable range" is in the usable range of the file stored in the storage unit 301. Here, the file detail information notified to the sink device 110 after the source device 101 transmits 100 bytes of the file A is shown. As shown in FIG. 7A, when the source device 101 deletes the transferred file, the "whole size" of the file A decreases by 100 bytes so as to become 900 bytes when 100 bytes' worth of the data transfer is completed from the head of the file A, and the "usable range." becomes "0-900 bytes" since the base point moves to the head of the file after deleting. On the other hand, as shown in FIG. 7B, when the source device 101 makes the transferred file unusable, although the "whole size" of the file A does not change before and after the file transfer, the "usable range" becomes "100-1000 bytes" because the base point moves from the head of the file to the location of 100 bytes.

When the transmitting unit 304 transmits the file to the sink device 110, the notification unit 305 creates the file detail information that includes the "whole size" and "usable range" for the file, and notifies the created file detail information to the sink device 110. Moreover, when the acceptance unit 306 accepts a query from the query unit 314 of the sink device 110, similar file detail information is created and notified to the sink device 110. Although the mode for notifying the file detail information to the sink device 110 is not limited, it is preferable to notify the file detail information as an extended HTTP (Hyper Text Transmission Protocol) header. The mode of the query from the sink device 110 is not limited, and any mode in which the command that can be interpreted by the source device 101 is transmitted is acceptable. Thus, the file detail information such as "usable range" is effective for the inquired method from the sink device 110 even when the sink device 110 goes down while the file is being transferred from the source device 101 to the sink device 110. That is, the file detail information held temporarily on the sink device 110 side is purged when the sink device 110 goes down. Even in this case, the sink device 110 can acquire the purged file detail information again by querying to the source device 101.

When the "whole size" and "usable range" are the same, the sink device 110 notified of the file detail information can judge that the transferred file has been deleted by the source device 101. Oppositely, when the "whole size" and "usable range" are different, the sink device 110 notified of the file detail information can judge that the transferred file is to be made unusable by the source device 101.

FIG. 8A and FIG. 8B are figures showing a file acquisition request created by the transmitting unit 313 of the sink device 110. FIG. 8A shows the file acquisition request created by the transmitting unit 313 of the sink device 110 when the source device 101 deletes the transferred file, and FIG. 8B shows the file acquisition request created by the transmitting unit 313 of the sink device 110 when source device 101 makes the transferred file unusable. Here, the case described is one in which where the sink device 110, which receives 100 bytes' worth of data from the head of the file A, further requests acquisition of the range from 100 to 200 bytes of the file A.

"File" indicates the file name of the file for which the acquisition request has been made. Here, the case where a request for acquisition of the file A is made is indicated. "Range" indicates the range of the file which carries out the acquisition request. Since the base point is always 0, as shown in FIG. 8A, when the source device 101 deletes the transferred file, the range of the file A requested to be acquired becomes "0-100 bytes". On the other hand, as shown in FIG. 8B, when the source device 101 makes the transferred file unusable, since the base point moves only by the size acquired from the head of the file A, the range of the file A requested to be acquired becomes "100-200 byte". It is preferable that the file acquisition request is transmitted using HTTP.

Figure 9:
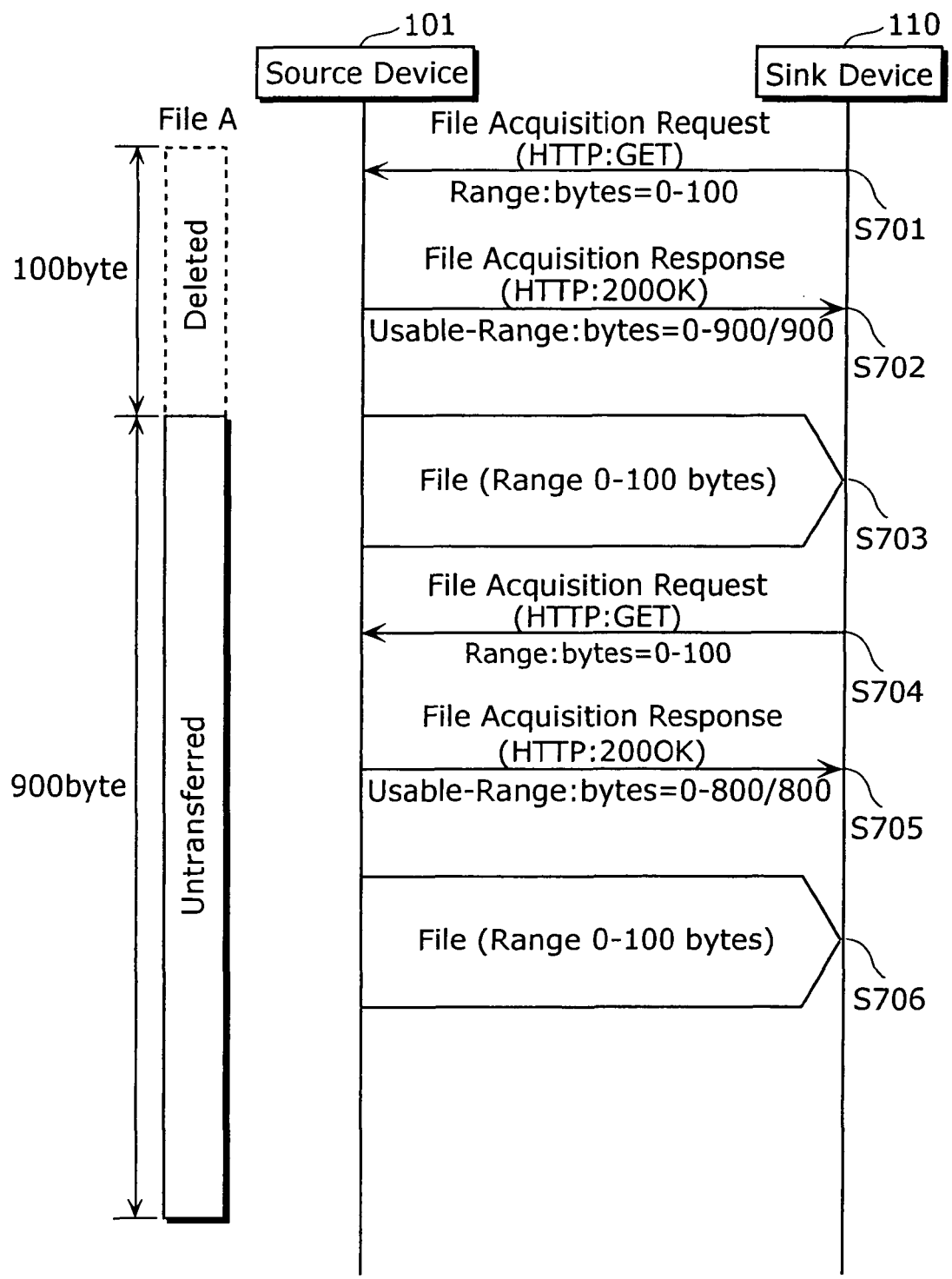
FIG. 9 is a sequence diagram between the source device where the transferred file is deleted and the sink device.

FIG. 9 is a sequence diagram between the source device 101, which deletes the transferred file, and the sink device 110. Hereafter, although a method for transferring the file using HTTP shall be explained, the transferring method is not limited hereto.

First, the sink device 110 transmits a GET request of HTTP to the source device 101 as an acquisition request of the file A (S701). A "range" header that indicates the acquisition range is included in this file acquisition request. Here, "range: bytes=0-100" is specified to acquire the range of 0 to 100 bytes.

Next, the source device 101 transmits 200 OK of HTTP to the sink device 110 as an acquisition response for the file A (S702). A "usable-range" header that indicates a usable range of the file A is included in this file acquisition response. This "usable-range" header is a header newly added this time, and it is described in the mode "usable-range:(usable range)/ (whole size)". As for the source device 101, when 100 bytes' worth of the data transfer is completed from the head of the file A, in order to delete data within the range, "usable-range: bytes=0-900/900" is specified for the "usable-range" header. Moreover, the source device 101 transmits data within range "range:bytes=0-100" specified in the file acquisition request to the sink device 110 (S703).

Next, the sink device 110 transmits the HTTP GET request to the source device 101 again as the acquisition request for the file A in order to acquire the continuation of the file A (S704). "Usable-range:bytes=0-900/900" is specified for the "usable-range" header from the source device 101. Then, the sink device 110 judges that the range of currently usable file A is "0-900 bytes" and specifies "range:bytes=0-100" again.

Next, the source device 101 transmits 200 OK of HTTP to the sink device 110 as the acquisition response for the file A (S705). As for the source device 101, when a data transfer within the range of 100 to 200 bytes of file A is completed, in order to delete data within the range again, "usable-range: bytes=0-800/800" is specified for the "usable-range" header. Moreover, the source device 101 transmits data within the range "range:bytes=0-100" specified in the file acquisition request to the sink device 110 again (S706).

Similar processing is repeated in the following. When the "usable-range" header from the source device 101 becomes "usable-range:bytes=0-0/0", (that is, when both L and M in "usable-range:L-M/N" become 0), the sink device 110 judges to have acquired the entire file A, and ends the processing. Or, when N in "usable-range:L-M/N" becomes 0, the sink device 110 may judge to have acquired the entire file A, and end processing.

Figure 10:
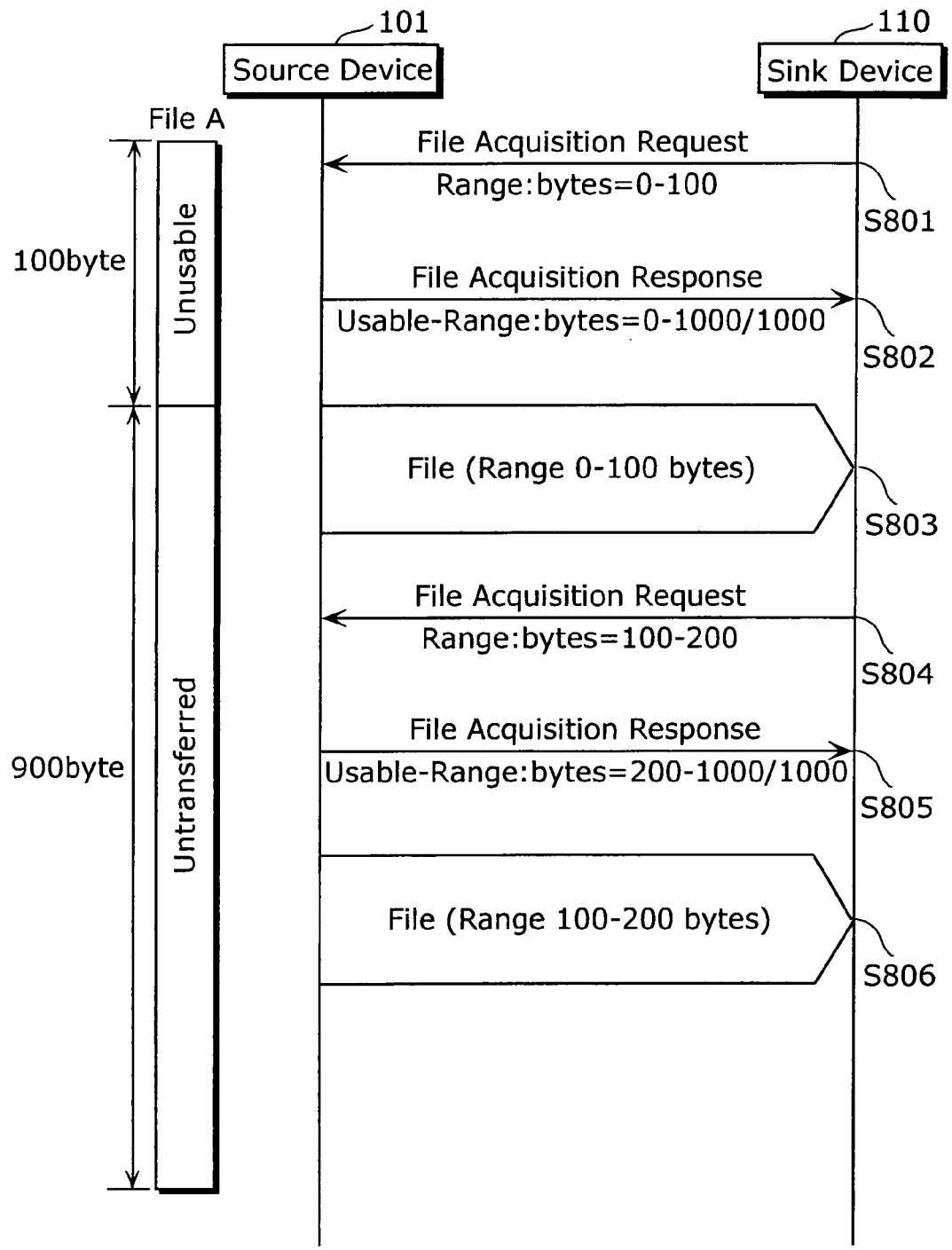
FIG. 10 is a sequence diagram between the source device where the transferred file is made unusable and the sink device.

FIG. 10 is a sequence diagram between the source device 101 that makes the transferred file unusable and the sink device 110. Here, although a method of transferring the file using HTTP shall be explained, the transferring method is not limited hereto.

First of all, the sink device 110 transmits an HTTP GET request to the source device 101 as an acquisition request for the file A (S801). "Range:bytes=0-100" is specified in this file acquisition request in order to acquire a range of 0 to 100 bytes.

Next, the source device 101 transmits 200 OK of HTTP to the sink device 110 as an acquisition response of the file A (S802). The Source device 101 specifies "usable-range: bytes=100-1000/1000" for the "usable-range" header to make the data within the range unusable when 100 bytes' worth of the data transfer is completed from the head of the file A. Moreover, the source device 101 transmits data within the range "range:bytes=0-100" specified in the file acquisition request to the sink device 110 (S803).

Next, the sink device 110 transmits the HTTP GET request to the source device 101 again as the acquisition request for the file A in order to acquire the continuation of the file A (S804). "Usable-range:bytes=100-1000/1000" is specified for the "usable-range" header from the source device 101. Then, the sink device 110 judges that the range of currently usable file A is "from 100 to 1000 bytes" and specifies "range: bytes=100-200".

Next, the source device 101 transmits 200 OK of HTTP to the sink device 110 as the acquisition response for file A (S805). The source device 101 specifies "usable-range: bytes=200-1000/1000" for the "usable-range" header to make data within the range unusable again when the data transfer within the range from 100 to 200 bytes of the file A is completed. Moreover, the source device 101 transmits data within the range "Range:bytes=100-200" specified in the file acquisition request to the sink device 110 (S806).

Similar processing is repeated in the following. When the "usable-range" header from the source device 101 becomes "usable-range:bytes=1000-1000/1000", (that is, when L and M in "usable-range:L-M/N" reach the same value), the sink device 110 judges to have acquired the entire file A, and ends processing. Or, when L and N in "usable-range:L-M/N" reach the same value, the sink device 110 may judge to have acquired the entire file A and end processing.

Next, an operation of the source device 101 shall be explained in detail.

Figure 11:
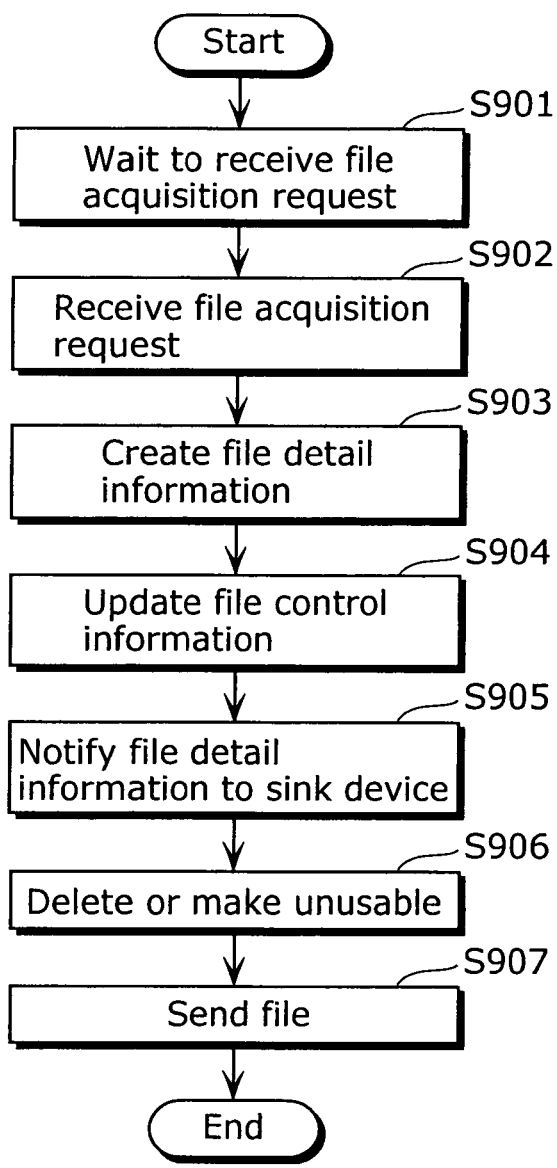
FIG. 11 is a figure showing a detailed operation of the source device in the first embodiment.

FIG. 11 is a figure showing a detailed operation of the source device 101 in the first embodiment. The receiving unit 303 waits for a file acquisition request (S901) and notifies the receipt to the file control unit 302 when the file acquisition request is received from the sink device 110 (S902).

The file control unit 302 extracts the "whole size" and "usable range" of the file that has been requested to be acquired with the file acquisition request from among the file control information, and passes these to the notification unit 305.

The notification unit 305 creates file detail information that includes the "whole size" and "usable range" (S903). At this time, when the source device 101 deletes the transferred file, the "whole size of the file" is subtracted on the basis of the range specified in the file acquisition request and "Usable range" is changed. On the other hand, when the source device 101 makes the transferred file unusable, only the "usable range" is changed, on the basis of the range specified in the file acquisition request. Then, the file control unit 302 is instructed so that the file control information is updated to details that match this file detail information (S904), and the file detail information is included in the file acquisition response and notified to the sink device 110 (S905).

The file control unit 302 passes the data of the range requested to be acquired to the transmitting unit 304 after the file acquisition response, and deletes the data within the range or make the data within the range unusable (S906). The transmitting unit 304 transmits the acquiring required data within the range to sink device 110 (S907).

Next, an operation of the sink device 110 shall be explained in detail.

Figure 12:
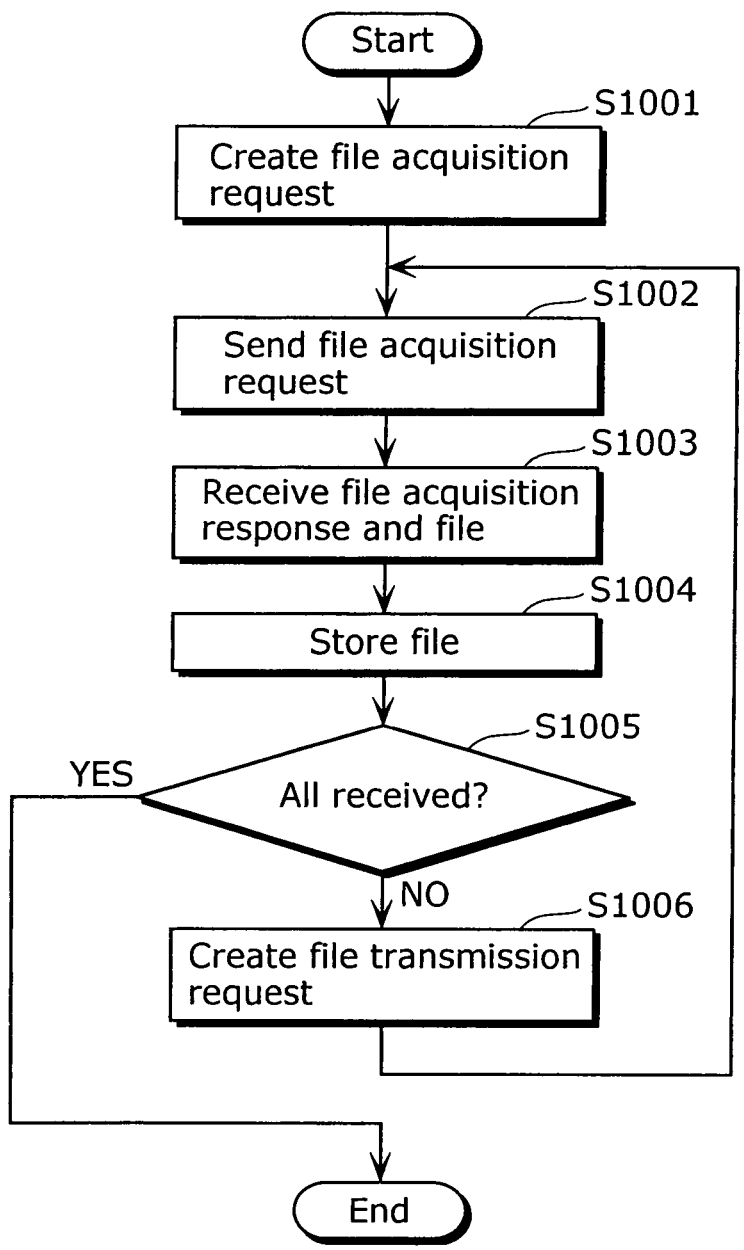
FIG. 12 is a figure showing a detailed operation of the sink device in the first embodiment.

FIG. 12 is a figure showing a detailed operation of the sink device 110 in the first embodiment.

When a user inputs a file transfer instruction from the input unit 318, this transferring instruction is notified to the transmitting unit 313. The transmitting unit 313 creates a file acquisition request that includes "file name" and "range", and transmits the file acquisition request to the source device 101 (S1001 to S1002).

When the file acquisition response and the file are received from the source device 101, the receiving unit 312 passes the file acquisition response and the file to the file control unit 316 (S1003). The file control unit 316 passes the file acquisition response to the transmitting unit 313 and passes the file to the storage unit 317, and the storage unit 317 stores the file (S1004).

The transmitting unit 313 judges whether to receive the entire file by analyzing the file acquisition response (S1005). When an unreceived part is present (S1005, NO), a new file acquisition request is created on the basis of the "whole size" and "usable range" included in the file acquisition response, and the request is transmitted to the source device 101 (S1006). This processing is repeated and finally ended when the entire file has been received (S1005, YES).

As described thus far, according to the file transfer system of the first embodiment, the sink device can execute the acquisition request for the file after understanding the state of the file stored in the source device. Accordingly, even when either the method to delete the file that the source device transferred or the method in which the file is made unusable is used, it is possible for the sink device to request the file transfer from the second time on without specifying a wrong range.

Second Embodiment

In the first embodiment, the mode that transfers the file A between one source device 101 and one sink device 110 was exemplified. However, the source device 101 may receive an acquisition request for the file A from a different sink device 1301 while the file A is being transferred from the source device 101 to the sink device 110. In this case, the file A stored in the source device 101 is deleted or made unusable. Therefore, the file A cannot be transferred from the source device 101 to the different sink device 1301.

A configuration of a file transfer system in the second embodiment shall be explained, and points different from the first embodiment shall be explained as follows. Here, the case described is one in which the source device 101 receives an acquisition request for the file A from the different sink device 1301 while the source device 101 transfers the file A of 1000 bytes to the sink device 110 in 100 bytes.

Figure 13:
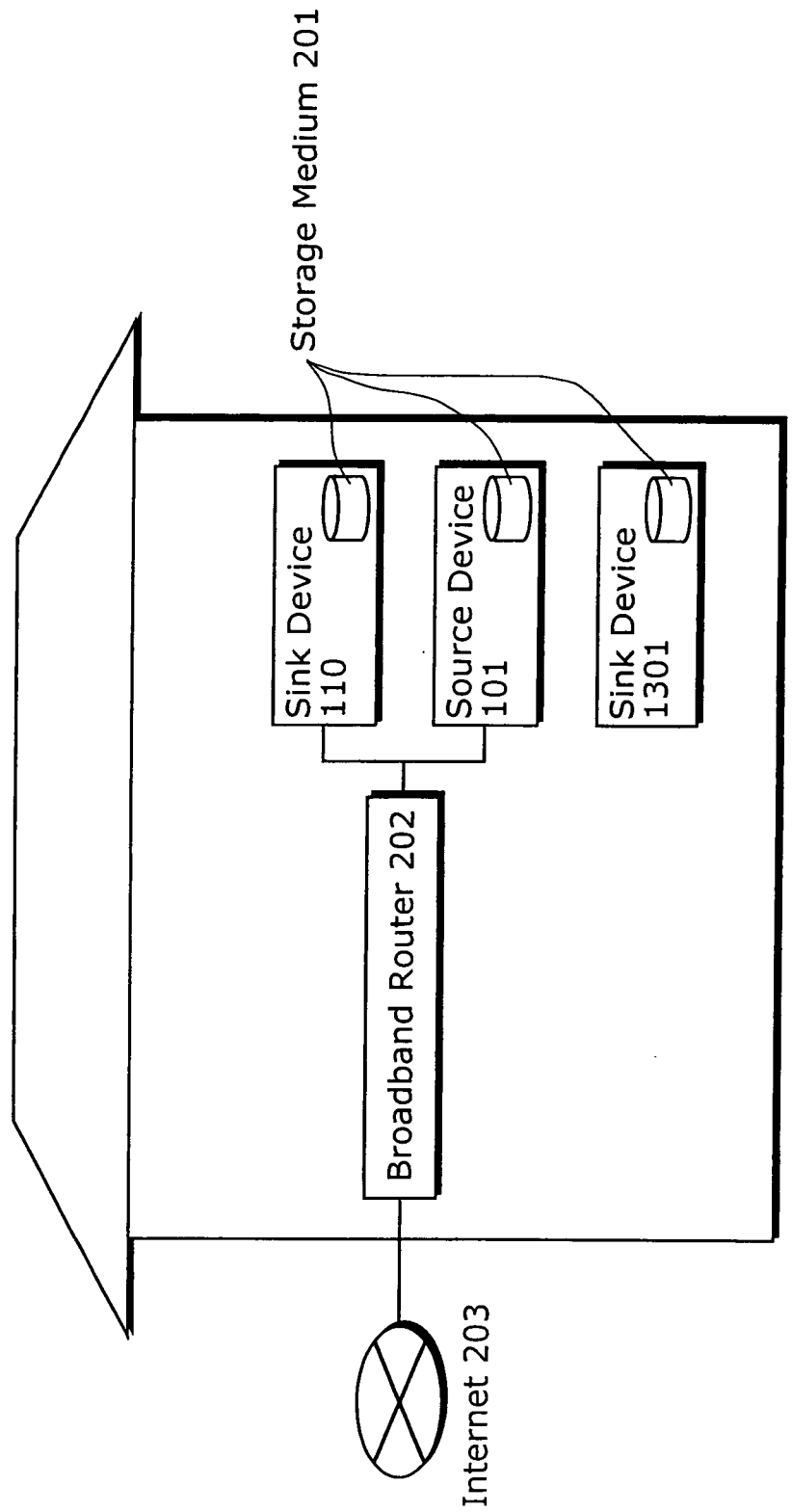
FIG. 13 is a figure showing the use environment of the file transfer system in a second embodiment.

FIG. 13 is a figure showing a use environment of a file transfer system in the second embodiment. This system is the same as in the first embodiment excluding the point that the different sink device 1301 is added to the network. This sink device 1301 is, like the sink device 101, a DVD/HDD hybrid recorder or the like which receives a file from the source device and stores the file in the storage medium 201.

Figure 14:
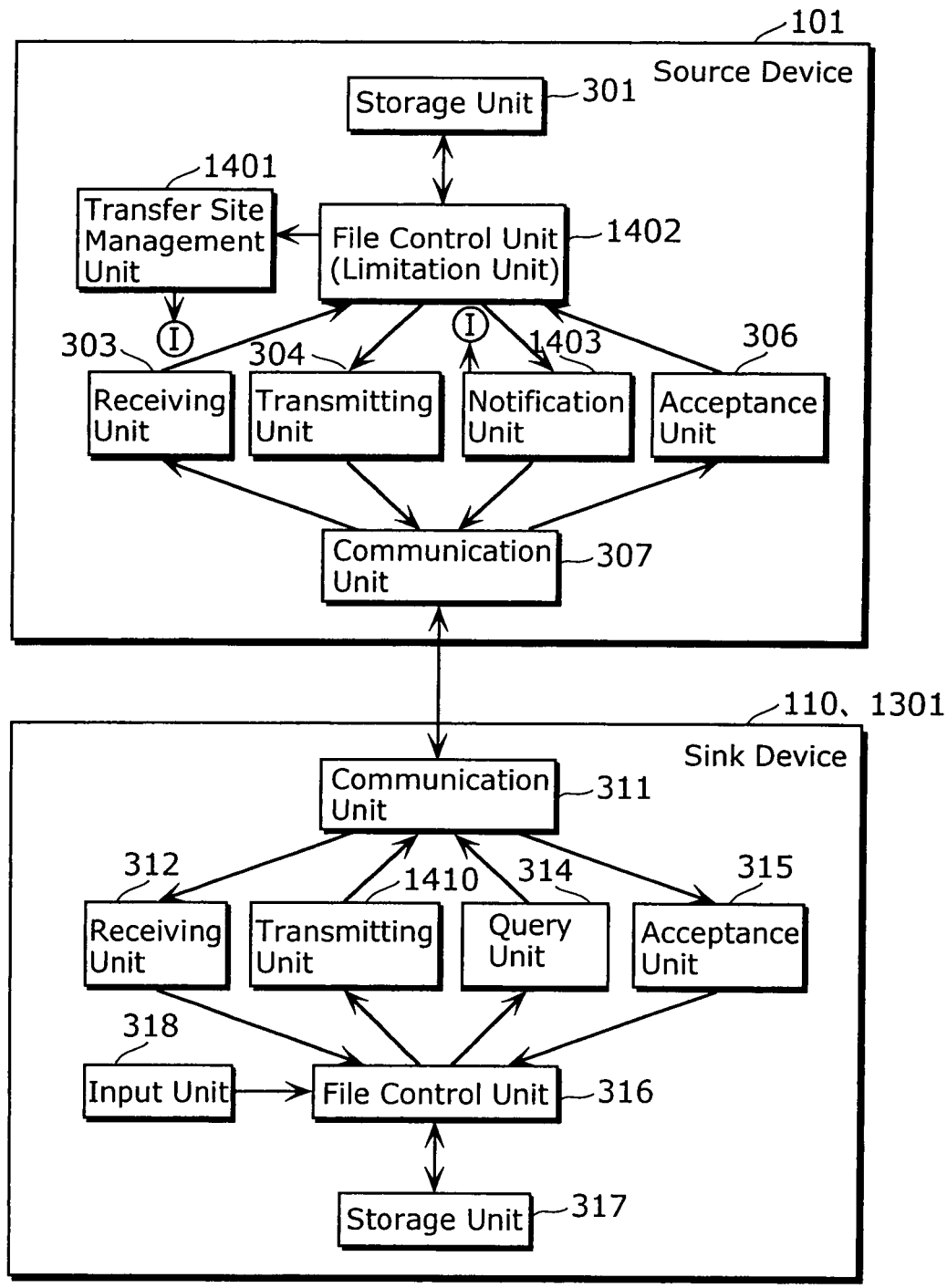
FIG. 14 is a figure showing an internal configuration of the source device and the sink device in the second embodiment.

FIG. 14 is a figure showing an internal configuration of the source device and the sink device in the second embodiment.

The source device 101 functionally includes a storage unit 301, a transfer site management unit 1401, a file control unit 1402, a receiving unit 303, a transmitting unit 304, a notification unit 1403, an acceptance unit 306, and a communication unit 307, as shown in this figure. Explanations of the storage unit 301, the receiving unit 303, the transmitting unit 304, the acceptance unit 306, and the communication unit 307 shall be omitted since these units are the same as in the first embodiment. The transfer site management unit 1401 manages transfer site information, which is information on the sink device 110, the sink device 110 being the transfer site of the file A. The file control unit 1402 manages file control information which contains a "transfer range" in addition to the "whole size" and "usable range". "Transfer range" indicates the range of the file A transferred from the source device 101 to the sink device 110. The notification unit 1403 creates file detail information that contains the "transfer site information" and "transfer range" in addition to the "whole size" and "usable range".

On the other hand, the sink device 110 functionally includes a communication unit 311, a receiving unit 312, a transmitting unit 1410, a query unit 314, an acceptance unit 315, a file control unit 316, a storage unit 317, and an input unit 318. Explanations of the communication unit 311, the receiving unit 312, the query unit 314, the acceptance unit 315, the file control unit 316, the storage unit 317, and the input unit 318 shall be omitted since these units are the same as in the first embodiment. The transmitting unit 1410 includes, in addition to the functions described in the first embodiment, a function to acquire the file from the transfer site when "transfer site information" is included in the file detail information received from the source device 101.

The function of the sink devices 110 and 1301 is the same, although two sink devices (that is, the sink device 1301 and the sink device 110) appear in the second embodiment. Moreover, when the file is transferred from the sink device 110 to the different sink device 1301, the sink device 110 that is the origin of the transfer may be called a "source device".

FIG. 15 is a figure showing transfer site information managed by the transfer site management unit 1401 of the source device 101. "File name" indicates the name of a file being transferred from among the files stored in the source device 101. Here, since the case where the file A is transferred from the source device 101 to the sink device 110 is assumed, a file A is specified by the "file name". Address data of the sink device 110, which is the transfer site of the file A, is specified by the "transfer site information". The "transfer site information" is not limited to the address data of the sink device 110; any information may be used as long as the information specifies the sink device 110.

FIG. 16A and FIG. 16B are figures showing file control information managed by the file control unit 1402 of the source device 101. FIG. 16A shows file control information managed by the file control unit 1402 of the source device 101 that deletes the transferred file, and FIG. 16B shows file control information managed by the file control unit 1402 of the source device 101 that makes the transferred file unusable. A state in which 100 bytes' worth of data from the head of the file A has been transmitted to the sink device 110 is assumed here. Descriptions regarding the "whole size" and "usable range" shall be omitted here as they are the same as in the first embodiment. "Transfer range" indicates a range of the file transferred from the source device 101 to the sink device 110. Here, since 100 bytes' worth of the data has been transferred from the head of file A, the "transfer range" becomes "0-100 bytes".

FIG. 17A and FIG. 17B are figures showing file detail information created by the notification unit 1403 of the source device 101. FIG. 17A shows file detail information created by the notification unit 1403 of the source device 101 that deletes the transferred file, and FIG. 17B shows file detail information created by the notification unit 1403 of the source device 101 that makes the transferred file unusable. Here, when the source device 101 receives an acquisition request for the file A from the different sink device 1301 while the source device 101 is transferring the file A to the sink device 110, the file detail information notified to the different sink device 1301 is shown. Explanations of the "whole size" and "usable range" shall be omitted as they are the same as in the first embodiment. Regarding the "transfer site information", information on the sink device that is the transfer site of the transferred file is inputted. Regarding the "transfer range", the range of the file that has already been transferred to the sink device is inputted.

As shown in FIG. 17A, when the source device 101 deletes the transferred file, the "whole size" becomes 900 bytes and the "usable range" becomes "0-900 bytes" in the same manner as in the first embodiment. "AAA.BBB.CCC.DDD", which is address information of the sink device 110, is inputted in "transfer site information". The range of "0-100 bytes" of the file A that has already been transferred to sink device 110 is inputted in "transfer range". On the other hand, as shown in FIG. 17B, when the source device 101 makes the transferred file unusable, the "whole size" is not changed before and after the file sending, in the same manner as in the first embodiment. Explanations of the "usable range", "transfer site information", and "transfer range" shall be omitted as they are similar to FIG. 17A.

The notification unit 1403 creates the file detail information that includes the "whole size", "usable range", "transfer site information", and "transfer range", and notifies the file detain information to the sink device 1301. Moreover, when the acceptance unit 306 accepts the query from the query unit 314 of the sink device 1301, similar file detail information is created and notified to the sink device 1301. Although the method for notifying the file detail information to the sink device 1301 is not particularly limited, it is preferable to notify the file detail information as an HTTP extended header. The sink device 1301 notified of the file detail information newly creates a file acquisition request by analyzing the "transfer site information" and "transfer range". Then, the entire file A is acquired by transmitting the acquisition request of this file A to the sink device 110 or the source device 101. In addition, details of the method by which the sink device 1301 acquires the entire file A shall be described later.

Figure 18:
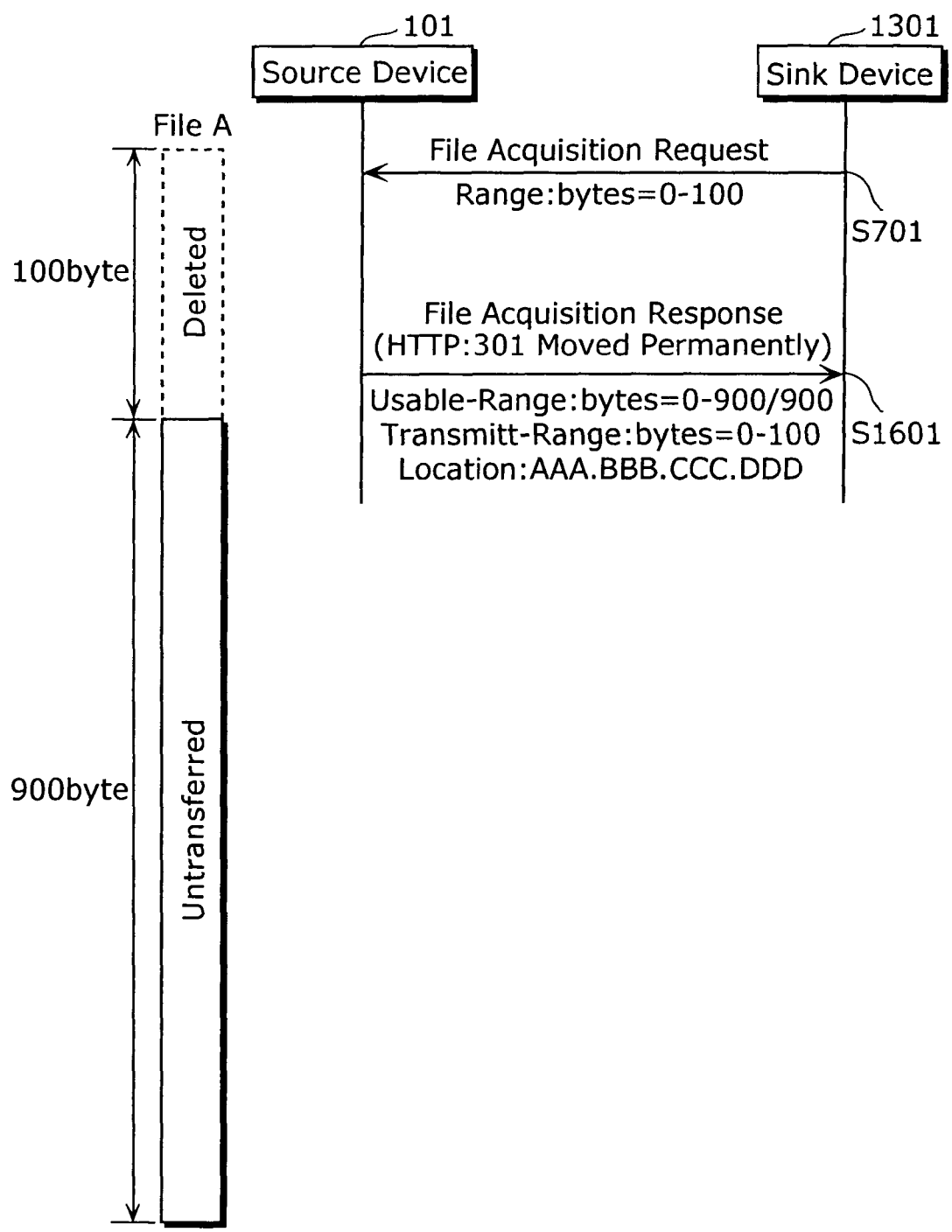
FIG. 18 is a sequence diagram between the source device where the transferred file is deleted and the sink device.

FIG. 18 is a sequence diagram showing a sequence performed between the source device that deletes the transferred file 101 and the sink device 1301. Here, the case described is one in which the source device 101 receives an acquisition request for the file A from the different sink device 1301 while the file A is being transferred from the source device 101 to the sink device 110.

Step S701 is the same as in the first embodiment, and thus explanations thereof shall be omitted.

Next, the source device 101 transmits an HTTP "301 Moved Permanently" to the sink device 1301 as an acquisition response for the file A (S1801). A "location" header that indicates information of the transfer site, a "usable-range" header that indicates a usable range of the file A, and a "transmit-range" header that indicates a range of the transferred file are included in this file acquisition response. As the "usable-range" is the same as that of the first embodiment, explanations thereof shall be omitted. The "transmit-range" header is denoted in the form "transmit-range: (transferred range of the file)". "Location" header is denoted in the form "location: (address information of the sink device that is the transfer site)". Here, the case described is one in which where the source device 101 receives the acquisition request of the file A from the different sink device 1301 when 100 bytes' worth of data from the head of the file A is transferred from the source device 101 to the sink device 110; therefore "transmit-range:bytes=0-100" is inputted to the "transmit-range" header, and "location:http://AAA.BBB.CCC.DDD" is inputted to the "location" header.

Figure 19:
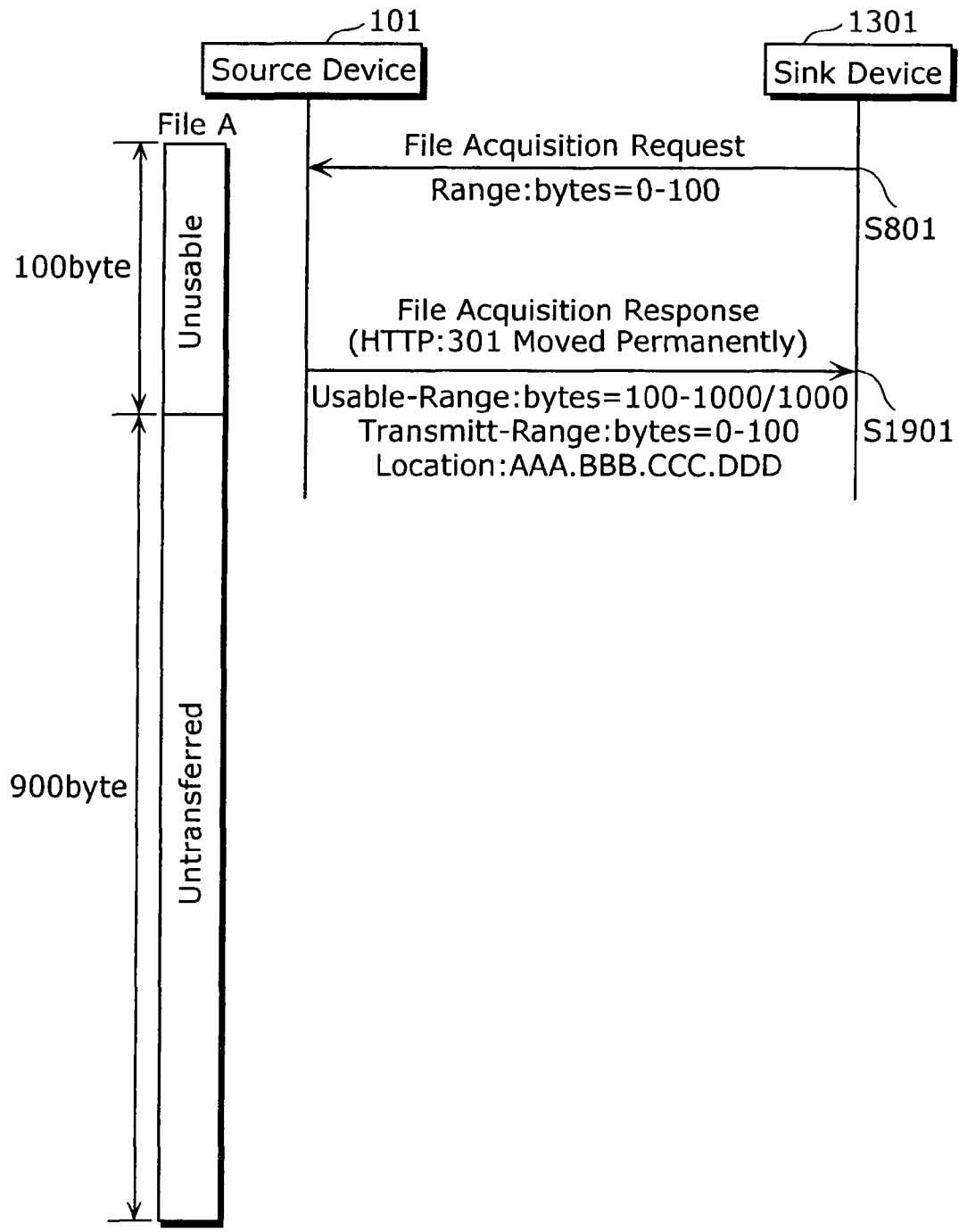
FIG. 19 is a sequence diagram between the source device where the transferred file is made unusable and the sink device.

FIG. 19 is a sequence diagram showing a sequence performed between the source device 101 that makes the transferred file unusable and the sink device 1301. Here, the case described is one in which the source device 101 receives an acquisition request for the file A from the different sink device 1301 while the file A is being transferred from the source device 101 to the sink device 110.

Step S801 is the same as in the first embodiment and thus descriptions thereof shall be omitted.

Next, the source device 101 transmits an HTTP "301 Moved Permanently" to the sink device 1301 as an acquisition response for the file A (S1901). The "location" header, "usable-range" header, and "transmit-range" header are included in this file acquisition response. Here, the case described is one in which the source device 101 receives the acquisition request for the file A from the different sink device 1301 when 100 bytes' worth of data from the head of the file A is transferred from the source device 101 to the sink device 110; therefore, "transmit-range:bytes=0-100" is inputted to the "transmit-range" header, and "location:http://AAA.BBB.CCC.DDD" is inputted to the "location" header.

Next, an operation of the source device 101 shall be explained in detail.

Figure 20:
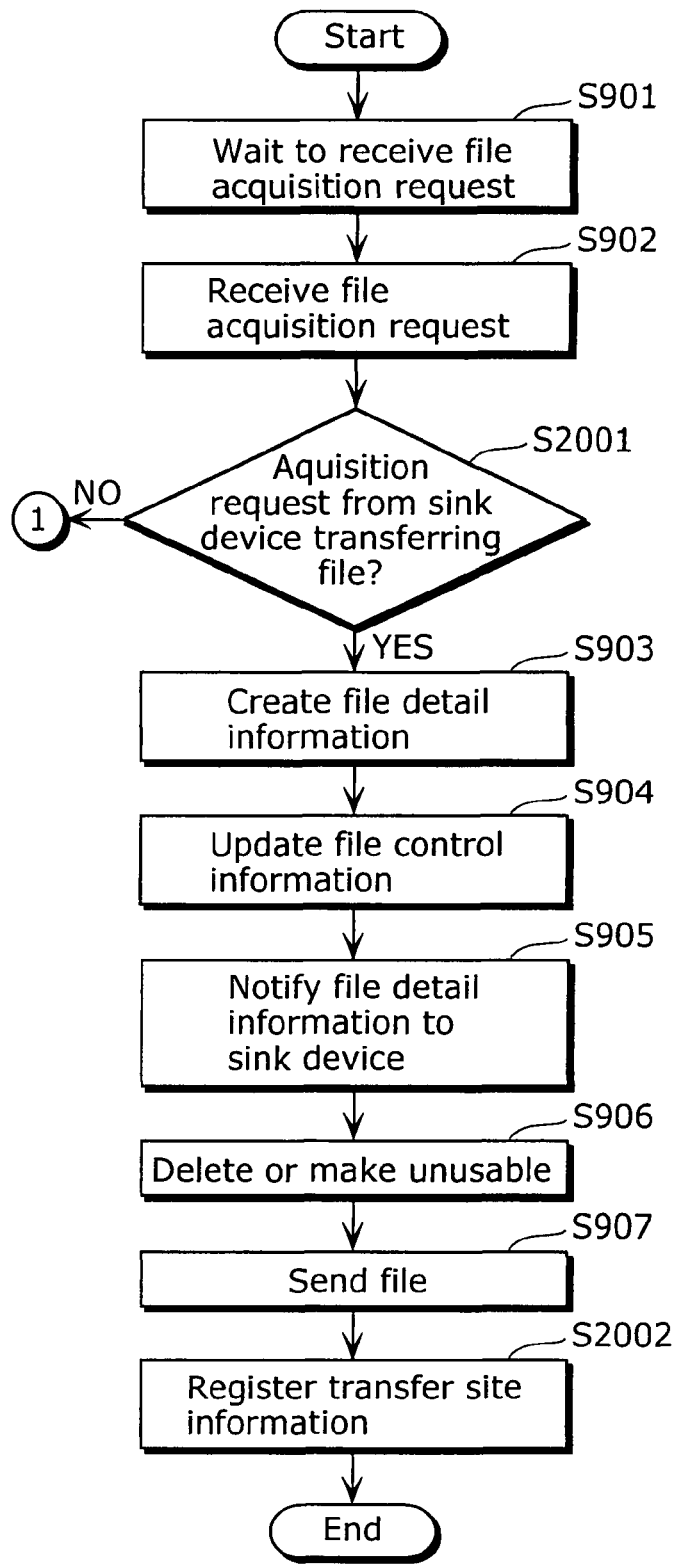
FIG. 20 is a figure showing a detailed operation of the source device in the second embodiment.
Figure 21:
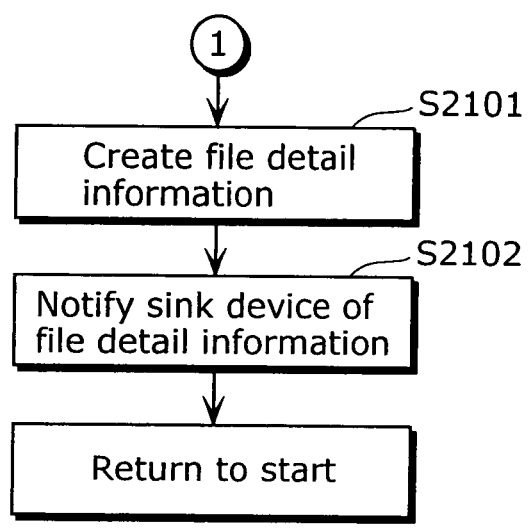
FIG. 21 is a figure showing a detailed operation of the source device in the second embodiment.

FIG. 20 and FIG. 21 are figures showing a detailed operation of the source device in the second embodiment.

Steps S901 to S902 are identical to those of the first embodiment, and thus explanations thereof shall be omitted.

Here, upon receiving an acquisition request for the file A, the file control unit 302 judges whether this acquisition request is an acquisition request sent from the sink device while the sink device is transferring a file, or in other words, whether this acquisition request is an acquisition request from the sink device 110 that is the transfer site of file A currently being transferred (S2001). If the acquisition request is an acquisition request from the sink device 110 while the sink device is transferring a file (S2001, Yes), file detail information is created (S903), file control information is updated (S904), the file detail information is notified to the sink device 110 (S905), data within the range specified in the acquisition request is deleted or made unusable (S906), and data within the range is transmitted to the sink device 110 (S907), in the same manner as in the first embodiment. However, since the "transfer range" is included in the file control information in the second embodiment, the "transfer range" is updated within the appropriate range of "0-100 bytes" or the like (S904). After this, the transfer site management unit 1401 registers the address data of the sink device 110 as the transfer site information (S2002).

On the other hand, when the acquisition request is not an acquisition request from the sink device 110 that is the transfer site of the file A (S2001, No), the notification unit 1403 creates file detail information (S2101). The "whole size", "usable range" and "transfer range" acquired from the file control unit 1402 and the "transfer site information" acquired from the transfer site management unit 1401 are included in this file detail information. The communication unit 307 notifies the file detail information created by the notification unit 1403 to the sink device 1301 (S2102).

Next, an operation of the sink device will be explained in detail.

Figure 22:
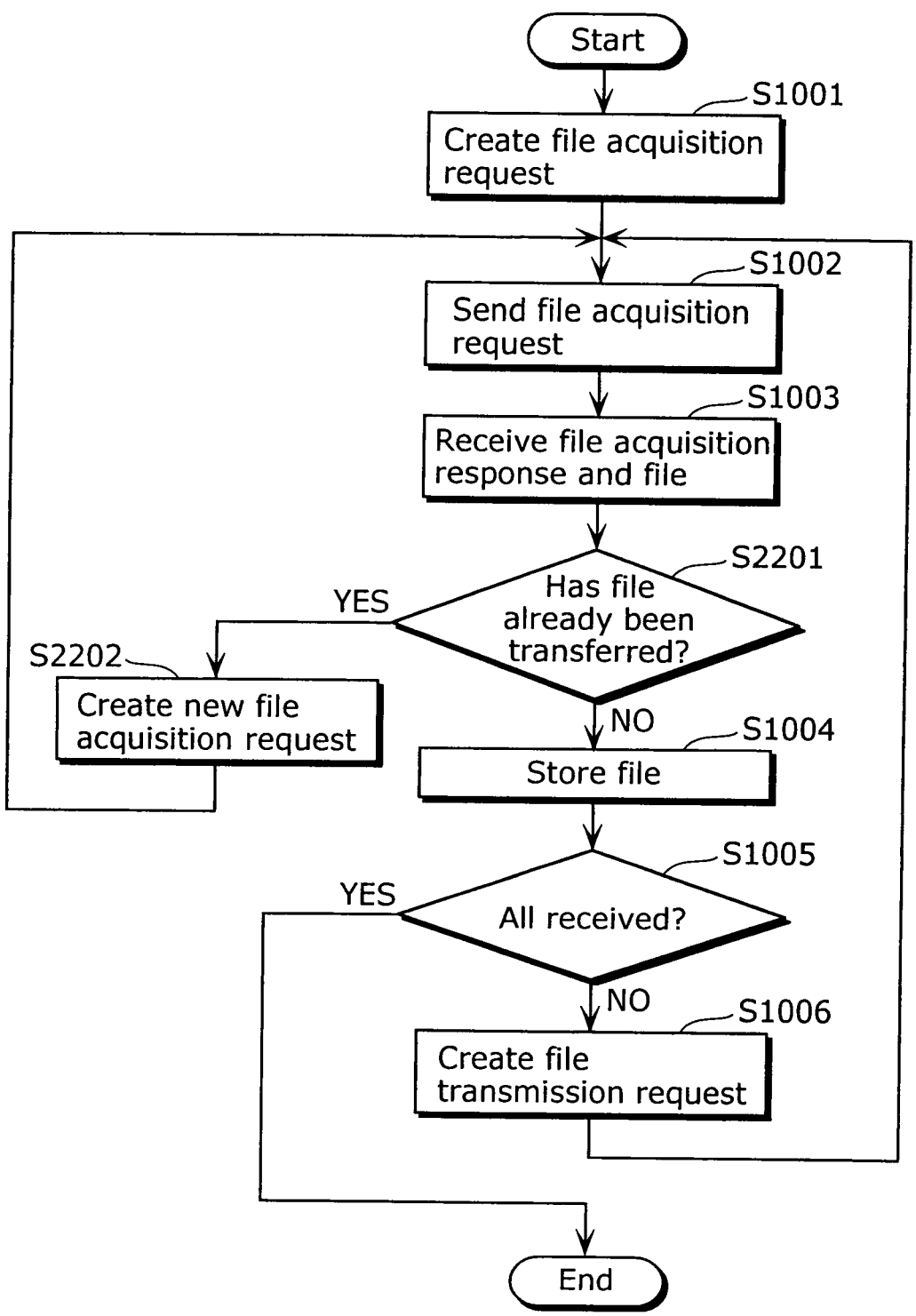
FIG. 22 is a figure showing a detailed operation of the sink device in the second embodiment.

FIG. 22 is a figure showing a detailed operation of the sink device in the second embodiment.

Steps S1001 to S1003 are identical to those of the first embodiment, and thus explanations thereof shall be omitted. When the file for which the acquisition request has been carried out has already been transmitted (S2201, Yes), the transmitting unit 1410 creates new file acquisition request (S2202). As shall be described later, this file acquisition request is transmitted to the sink device 110 or the source device 101 by the transmitting unit 1410 (S1002).

Here, "when the file for which the acquisition request has been carried out has already been transmitted (S2201, Yes)" refers to the case where the "transfer site information" is included in the file detail information received by the communication unit 311. That is, the "sink device" referred to when "Yes" is judged in step S2201 is not the sink device 110 that sent the acquisition request first but rather is the sink device 1301 which sent the acquisition request after.

On the other hand, "when the file for which the acquisition request has not been carried out has already been transmitted (S2201, No)" refers to the case where the "transfer site information" is not included in the file detail information received by the communication unit 311. That is, the "sink device" referred to when "No" is judged in step S2201 is not the sink device 1301 which sent the acquisition request after but rather is the sink device 110 that sent the acquisition request first. Operation of this sink device 110 is identical to that described in the first embodiment, and thus descriptions thereof shall be omitted.

Hereafter, the mode by which the sink device 1301 acquires the entire file A shall be explained in detail.

FIG. 23A to FIG. 23E are figures showing a first mode by which the sink device 1301 acquires the entire file A. Here, for the sake of simplicity, it is assumed that the whole size of the file A is 200 bytes, and that data is transferred in 100-byte units.

First, as shown in FIG. 23A, it is assumed that while 100 bytes' worth of data a1 is being transferred from the source device 101 to the sink device 110 from the head of file A (S1), the source device 101 has received an acquisition request for the file A from the different sink device 1301 (S2).

In this case, the source device 101 transmits remaining data a2 to the sink device 110 (S3) and notifies a file acquisition response to the sink device 1301 (S4) as shown in FIG. 23B. The "location" header, which indicates at least the address data of the sink device 110, is included in this file acquisition response. In addition, the X in FIG. 23B means that the data a1 is deleted or is made unusable (the same applies to other diagrams as well).

Accordingly, the sink device 1301 transmits the acquisition request for the file A to the sink device 110 (S5) as shown in FIG. 23C. The sink device 110 that receives the acquisition request transmits 100 bytes' worth of data a1 from the head of the file A to the sink device 1301 (S6) as shown in FIG. 23D. Processing of remaining data a2 similar to step S5 and S6 is executed. As a result, the sink device 1301 acquires the entire file A, as shown in FIG. 23E.

FIG. 24A to FIG. 24E are figures showing a second mode by which the sink device 1301 acquires the entire file A.

Figure 24A:
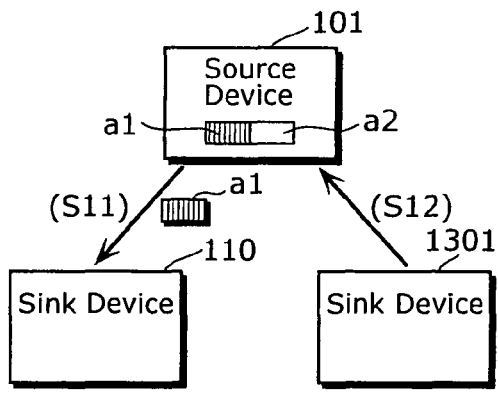
FIG. 24A to FIG. 24E are figures showing a second mode in which the sink device acquires the entire file.

Here, as shown in FIG. 24A, it is assumed that while 100 bytes' worth of data a1 is transferred from the source device 101 to the sink device 110 from the head of file A (S11), the source device 101 has received an acquisition request for the file A from the different sink device 1301 (S12).

Figure 24B:
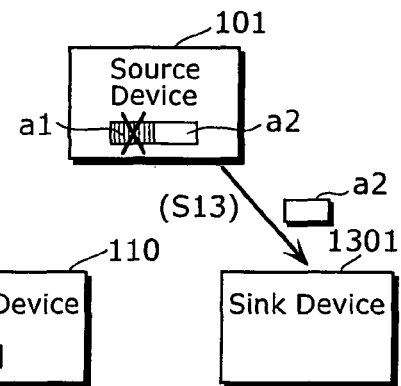

In this case, the source device 101 transmits remaining data a2 to the sink device 1301 and notifies a file acquisition response to the sink device 1301 (S13), as shown in FIG. 24B. The "usable-range" header that indicates a usable range of the file A, the "location" header that indicates address data of the sink device 110, and the "transmit-range" header that indicates a range of the file A transferred to the sink device 110 are included in this file acquisition response.

Figure 24C:
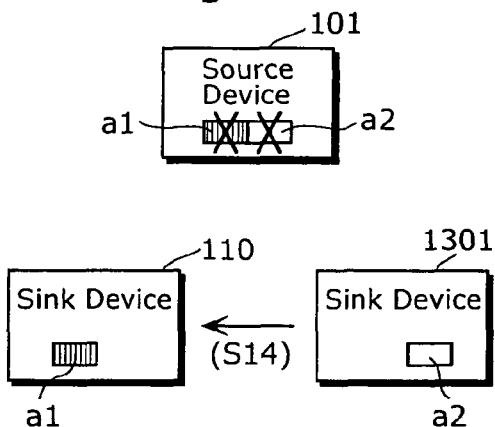
Figure 24D:
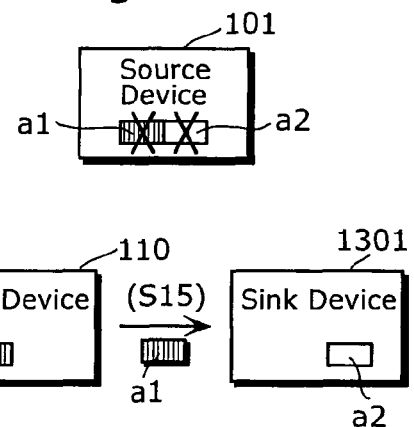
Figure 24E:
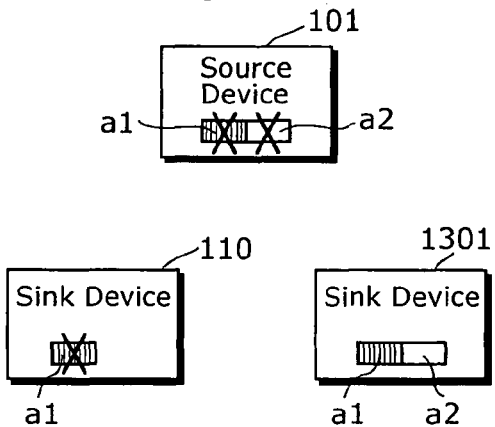

Accordingly, the sink device 1301 transmits the acquisition request for the file A to the sink device 110 (S14) as shown in FIG. 24C. In this acquisition request, an appropriate range "0-100 bytes" for the file A can be specified on the basis of the "transmit-range" included in the file acquisition response. Accordingly, the sink device 110 transmits 100 bytes' worth of data a1 from the head of the file A to the sink device 1301 (S15), as shown in FIG. 24D. As a result, the sink device 1301 acquires the entire file A, as shown in FIG. 24E.

FIG. 25A to FIG. 25E are figures showing a third mode by which the sink device 1301 acquires the entire file A.

Figure 25A:
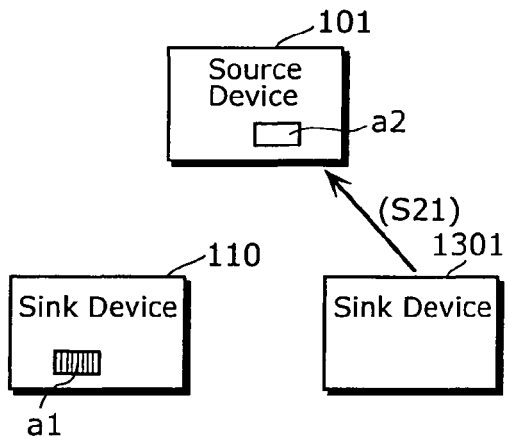
FIG. 25A to FIG. 25E are figures showing a third mode in which the sink device acquires the entire file.

Here, the situation in which 100 bytes' worth of data a1 is taken from the head of the file A and stored in the source device 101, and the situation in which remaining data a2 is stored in the sink device 110, are assumed, as shown in FIG. 25A. In such a situation, for example, a section from 7:00 PM to 8:00 PM of a television broadcast that runs from 7:00 PM to 9:00 PM which has been stored in the source device is transferred to the sink device 110. In this case, the file control unit 1402 of the source device 101 manages information which states that the transfer range of file A is "a part from 7:00 PM to 8:00 PM", and the transfer site management unit 1401 of the source device 101 manages information which states that the transfer site of the file A is the sink device 110.

Figure 25B:
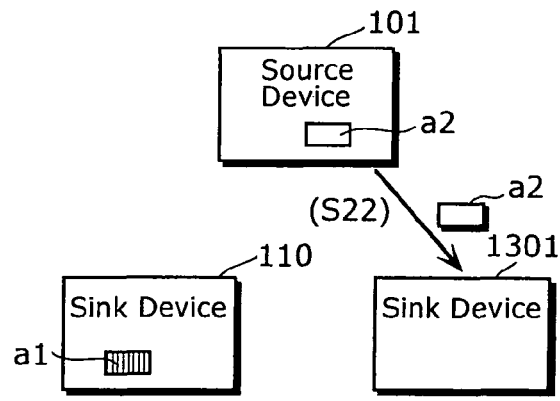

In this situation, it is assumed that the source device 101 has received an acquisition request for the file A from the sink device 1301 (S21). In this case, the source device 101 transmits remaining data a2 to the sink device 1301, and notifies a file acquisition response to the sink device 1301 (S22), as shown in FIG. 25B. The "usable-range" header that indicates a usable range of the file A, "location" header that indicates address data of the sink device 110, and "transmit-range" header that indicates a range of the file A transferred to the sink device 110 are included in this file acquiring response.

Figure 25C:
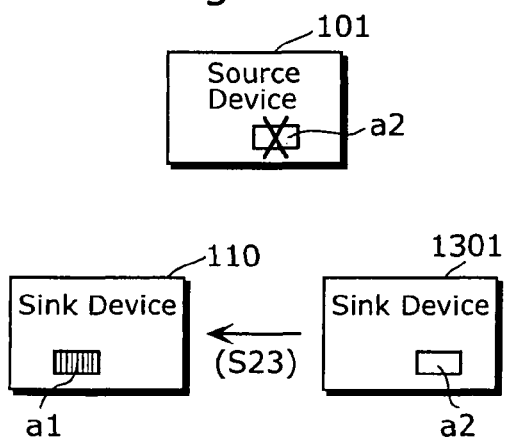
Figure 25D:
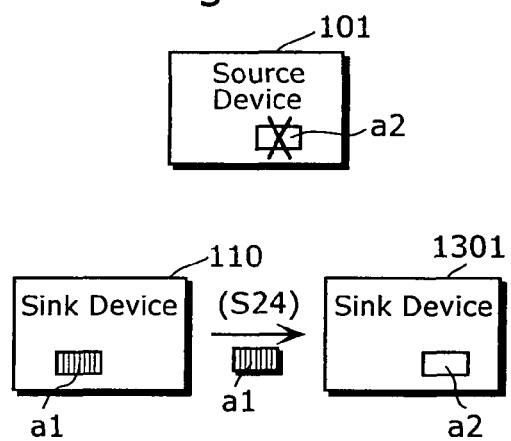
Figure 25E:
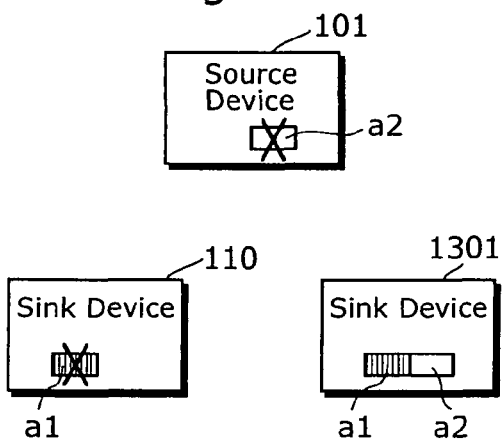

Accordingly, the sink device 1301 transmits the acquisition request for the file A to the sink device 110 (S23) as shown in FIG. 25C. In this acquisition request, an appropriate range "0-100 bytes" for the file A can be specified on the basis of the "transmit-range" included in the file acquisition response. Accordingly, the sink device 110 transmits 100 bytes' worth of data a1 from the head of the file A to the sink device 1301 (S24), as shown in FIG. 25D. As a result, the sink device 1301 acquires the entire file A, as shown in FIG. 25E.

As described thus far, according to the file transfer system of the second embodiment, while the file A is being transferred from the source device 101 to the sink device 110, the address data of sink device 110 that is the transfer site and the range of the transferred file is notified to the sink device 1301, even when the source device 101 receives an acquisition request for the file A from the different sink device 1301. Accordingly, it is possible for the sink device 1301 to acquire the entire file A for which the acquisition request has been sent to the source device 101.

Moreover, the address data of the sink device 110 that is the transfer site and the transferred file range are notified to the sink device 1301 even when a part of file A is stored in the source device 101 and the remainder is stored in the sink device 110. Accordingly, it is possible for the sink device 1301 to acquire the entire file A for which the acquisition request has been sent to the source device 101.

It should be noted that although in the above descriptions the whole size of the file A is notified by the source device 101 to the sink device 110 along with a usable range of file A, it is not necessary for the source device 101 to notify the whole size of the file A to the sink device 110. For example, rather than the description form "usable-range:(usable range)/(whole size)", the description form "usable-range:(usable range)" is sufficient as the description form of "usable-range" header. This is because it is possible that the sink device requires the file transfer for the second time on without specifying the mistaken range as long as at least the "usable range" is notified to the sink apparatus.

When information on the whole size of the file A is needed when the file A is reproduced on the sink device side, only the whole size of the file A along with the usable range of the file A may be notified to the sink device 110 by the source device 101, as described above. However, the "whole size" here is the whole size of the file after being deleted or being made unusable by the source device 101. When the information of the whole size of file is necessary on the sink device side before the file is deleted or made unusable by the source device 101, the "size before transfer" only may be notified to the sink device 110 by the source device 101.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The file transfer system according to the present invention is applicable for use in home electric appliances, PCs, and the like which require a file which can be copied for one generation to be divided and transmitted.

What is claimed is:

1. A file transmitting apparatus which moves a file to another apparatus, said file transmitting apparatus comprising:
    a storage unit which stores the file;
    a receiving unit operable to receive, from the other apparatus, a file acquisition request, which is an acquisition request for requesting transfer of the file and which specifies, from among data included in the file, data within a range in which the data is neither deleted nor made unusable;
    a transmitting unit operable to, when the file acquisition request has been received, divide the file stored in said storage unit into first data and second data, and transmit, to the other apparatus, only the first data from the first and second data, the first data being data within the range specified in the file acquisition request received by said receiving unit and the second data being data not within the range specified in the file acquisition request received by said receiving unit;

a limitation unit operable to delete or make unusable the first data being within the range transmitted by said transmitting unit, from among the data included in the file stored in said storage unit; and a notification unit operable to notify the other apparatus of a usable range which indicates the second data and which is a range in which the data included in the file is neither deleted nor made unusable by said limitation unit, from among the data included in the file stored in said storage unit.

2. The file transmitting apparatus according to claim 1, wherein said notification unit is operable to notify, to the other apparatus, the size of the entire file after the first data has been deleted or made unusable by said limitation unit.

3. The file transmitting apparatus according to claim 1, wherein said notification unit is operable to notify, to the other apparatus, the size of the entire file before the first data is deleted or made unusable by said limitation unit.

4. The file transmitting apparatus according to claim 1, further comprising:

an acceptance unit operable to accept, from the other apparatus, a query regarding the usable range, wherein said notification unit is operable to notify the usable range to the other apparatus in the case where the query has been accepted by said acceptance unit.

5. The file transmitting apparatus according to claim 1, wherein said receiving unit is operable to receive the file acquisition request from a different apparatus that is not the other apparatus; and said notification unit is operable to notify the different apparatus of information that can specify the other apparatus.

6. The file transmitting apparatus according to claim 5 wherein said notification unit is operable to notify the different apparatus of the usable range.

7. The file transmitting apparatus according to claim 5, wherein said notification unit is operable to notify the different apparatus of the range that has been transmitted to the other apparatus, from among the file stored in said storage unit.

8. A file transmitting method for moving a file to another apparatus, said method comprising:

storing the file;

receiving, from the other apparatus, a file acquisition request, which is an acquisition request for requesting transfer of the file and which specifies, from among data included in the file, data within a range in which the data is neither deleted nor made unusable;

dividing the file stored in said storage unit into first data and second data;

transmitting, to the other apparatus, only the first data from the first and second data, the first data being data within the range specified in the file acquisition request and the second data being data not within the range specified in the file acquisition request;

deleting or making unusable the first data being within the range transmitted, from among the data included in the stored file; and notifying the other apparatus of a usable range which indicates the second data and which is a range in which the data included in the file is neither deleted nor made unusable, from among the data included in the stored file.

9. A non-transitory computer readable recording medium on which a program for moving a file to another apparatus is recorded, said program causing a computer to execute the steps of:

storing the file;

receiving, from the other apparatus, a file acquisition request, which is an acquisition request for requesting transfer of the file and which specifies, from among data included in the file, data within a range in which the data is neither deleted nor made unusable;

dividing the file stored in said storage unit into first data and second data;

transmitting, to the other apparatus, only the first data from the first and second data, the first data being data within the range specified in the file acquisition request and the second data being data not within the range specified in the file acquisition request;

deleting or making unusable the first data being within the range transmitted, from among the data included in the stored file; and notifying the other apparatus of a usable range which indicates the second data and which is a range in which the data included in the file is neither deleted nor made unusable, from among the data included in the stored file.

10. A file transfer system which transfers a file from a file transmitting apparatus that moves the file to a file receiving apparatus that receives the file, wherein the file transmitting apparatus includes:

a storage unit which stores the file;

a receiving unit operable to receive, from the other apparatus, a file acquisition request, which is an acquisition request for requesting transfer of the file and which specifies, from among data included in the file, data within a range in which the data is neither deleted nor made unusable;

a transmitting unit operable to, when the file acquisition request has been received, divide the file stored in said storage unit into first data and second data, and transmit, to the other apparatus, only the first data from the first and second data, the first data being data within the range specified in the file acquisition request received by said receiving unit and the second data being data not within the range specified in the file acquisition request received by said receiving unit;

a limitation unit operable to delete or make unusable the first data being within the range transmitted by said transmitting unit, from among the data included in the file stored in said storage unit; and a notification unit operable to notify the other apparatus of a usable range which indicates the second data and which is a range in which the data included in the file is neither deleted nor made unusable by said limitation unit, from among the data included in the file stored in said storage unit, and the file receiving apparatus includes:

an acceptance unit operable to accept, from the other apparatus, a notification of a usable range which indicates second data that is part or all of data included in the file and which is a range in which the data included in the file is neither deleted nor made unusable by the other apparatus;

a transmitting unit operable to specify an arbitrary range included in the usable range indicated by the notification accepted by said acceptance unit and transmit, to the other apparatus, a file acquisition request, which is an acquisition request for requesting transfer of the file and is used to acquire first data that is data within a specified range of the second data;

a receiving unit operable to receive, from the other apparatus, the first data indicated by the range specified in the file acquisition request; and a storage unit which stores the first data received by said receiving unit.

* * * * *